US007702802B2

(12) United States Patent
Stillion et al.

(10) Patent No.: US 7,702,802 B2
(45) Date of Patent: Apr. 20, 2010

(54) SHARING FRAMEWORK FOR RESOURCE SHARING

(75) Inventors: Cameron D. Stillion, Redmond, WA (US); Glenn L. Frankel, Atlanta, GA (US); Michael A. Affronti, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 11/250,662

(22) Filed: Oct. 14, 2005

(65) Prior Publication Data

US 2006/0123011 A1    Jun. 8, 2006

Related U.S. Application Data

(63) Continuation-in-part of application No. 11/004,577, filed on Dec. 3, 2004, now Pat. No. 7,587,501.

(51) Int. Cl.
G06F 15/16  (2006.01)
(52) U.S. Cl. ............... 709/229; 709/204; 709/206; 707/10
(58) Field of Classification Search ........... 709/204, 709/206, 229; 707/10
See application file for complete search history.

(56) References Cited

U.S. PATENT DOCUMENTS

| 5,093,901 | A | * | 3/1992 | Cree et al. ............... 715/753 |
| 6,016,478 | A | * | 1/2000 | Zhang et al. ............. 705/9 |
| 6,088,702 | A | | 7/2000 | Plantz et al. ............ 707/103 R |
| 6,324,587 | B1 | | 11/2001 | Trenbeath et al. ........ 719/310 |
| 6,360,254 | B1 | * | 3/2002 | Linden et al. ............ 709/219 |
| 6,708,162 | B1 | | 3/2004 | Morgan et al. ........... 707/3 |
| 2001/0049611 | A1 | * | 12/2001 | Peach ..................... 705/4 |
| 2002/0010736 | A1 | * | 1/2002 | Marques et al. ......... 709/201 |
| 2002/0038316 | A1 | * | 3/2002 | Onyon et al. ............ 707/204 |
| 2002/0049610 | A1 | * | 4/2002 | Gropper .................. 705/1 |
| 2003/0009536 | A1 | * | 1/2003 | Henderson et al. ...... 709/219 |

(Continued)

FOREIGN PATENT DOCUMENTS

WO    WO2005029314    3/2005

OTHER PUBLICATIONS

Novell; "The DirXML Starter Pack, Data Sharing Model"; Dec. 15, 2003; 86 Pgs.; http://www.novell.com/documentation/dirxmlstarterpack/index.html?page=/documentation/dirxmlstarterpack/mariner/data/ak34xnl.html.

(Continued)

Primary Examiner—Thu Nguyen
Assistant Examiner—Thomas J Dailey
(74) Attorney, Agent, or Firm—Merchant & Gould, P.C.

(57) ABSTRACT

A sharing infrastructure is directed at providing a framework for sharing resources between initiators and participants. The sharing infrastructure is designed to manage and direct various sharing providers, articulate information about sharing relationships, and to provide a framework for pluggable data sharing, data discovery, schema translation, and conflict resolution. The infrastructure allows for common sharing operations to be implemented in a more centralized fashion, and eases the cost of implementing new sharing providers. An extensible and pluggable provider model eases remote and local configuration; schema mapping; and protocol handling. A sharing protocol is defined that relates to establishing and managing a sharing relationship.

18 Claims, 14 Drawing Sheets

U.S. PATENT DOCUMENTS

| | | | |
|---|---|---|---|
| 2003/0061087 A1* | 3/2003 | Srimuang | 705/8 |
| 2003/0081000 A1 | 5/2003 | Watanabe et al. | 715/751 |
| 2003/0225840 A1 | 12/2003 | Glassco et al. | 709/206 |
| 2004/0044536 A1* | 3/2004 | Fitzpatrick et al. | 705/1 |
| 2004/0054665 A1 | 3/2004 | Yoo et al. | 707/3 |
| 2004/0187136 A1 | 9/2004 | Bhogal et al. | 719/311 |
| 2004/0254912 A1 | 12/2004 | Glassco et al. | 707/1 |
| 2005/0138566 A1 | 6/2005 | Muller et al. | 715/759 |

OTHER PUBLICATIONS

ShareIt DataNet Products; "*ShareIt Client Components*"; http://www.adamaitis.net/products/default.htm; 2004; 2 Pgs.

Oasis; "*Members form XRI Data Interchange (XDI) Technical Committee*"; Jan. 21, 2004; 5 Pgs.; http://xml.coverpages.org/ni2004-01-21-b.html.

\* cited by examiner

SHARING FRAMEWORK FOR RESOURCE SHARING

RELATED APPLICATIONS

This utility patent application is a continuation-in-part of U.S. patent application Ser. No. 11/004,577 filed Dec. 3, 2004, which application is incorporated herein by reference, and the benefit of the filing date of which is hereby claimed under 35 U.S.C. 120.

BACKGROUND

Electronic communication has become an integral part of an individual's life both at business and at home. Through the use of electronic communications, such as email, Instant Messaging, SMS, and the like, individuals are able to keep in touch, transact business and set up meetings. For example, some personal information manager (PIM) programs allow a user to select a time on their calendar, create an appointment, and select people to invite to the meeting. Once the details of the meeting are set, the user may email a meeting notice to each of the requested participants. Each of the requested participants then receives an email in their inbox. When the user opens the meeting request, their PIM may determine if the requested meeting conflicts with an existing item in their calendar, and they can either accept, tentatively accept, or decline the meeting. The organizer can track who has accepted, declined, or counter-proposed times, simply by opening the meeting within the PIM program.

Sharing other resources with a user, however, is not as simple. While it is possible to share files, folders, and calendars with other users, initiating and setting up this sharing can be cumbersome and difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A sharing infrastructure is directed at providing a framework for sharing resources between initiators and participants. The sharing infrastructure is designed to manage and direct various sharing providers, articulate information about sharing relationships, and to provide a framework for pluggable data sharing, data discovery, schema translation, and conflict resolution. The infrastructure allows for common sharing operations to be implemented in a more centralized fashion, and eases the cost of implementing new sharing providers. An extensible and pluggable provider model eases remote and local configuration; schema mapping; and protocol handling. A sharing protocol is defined that establishes and manages the sharing relationships.

DETAILED DESCRIPTION

Figure 1:
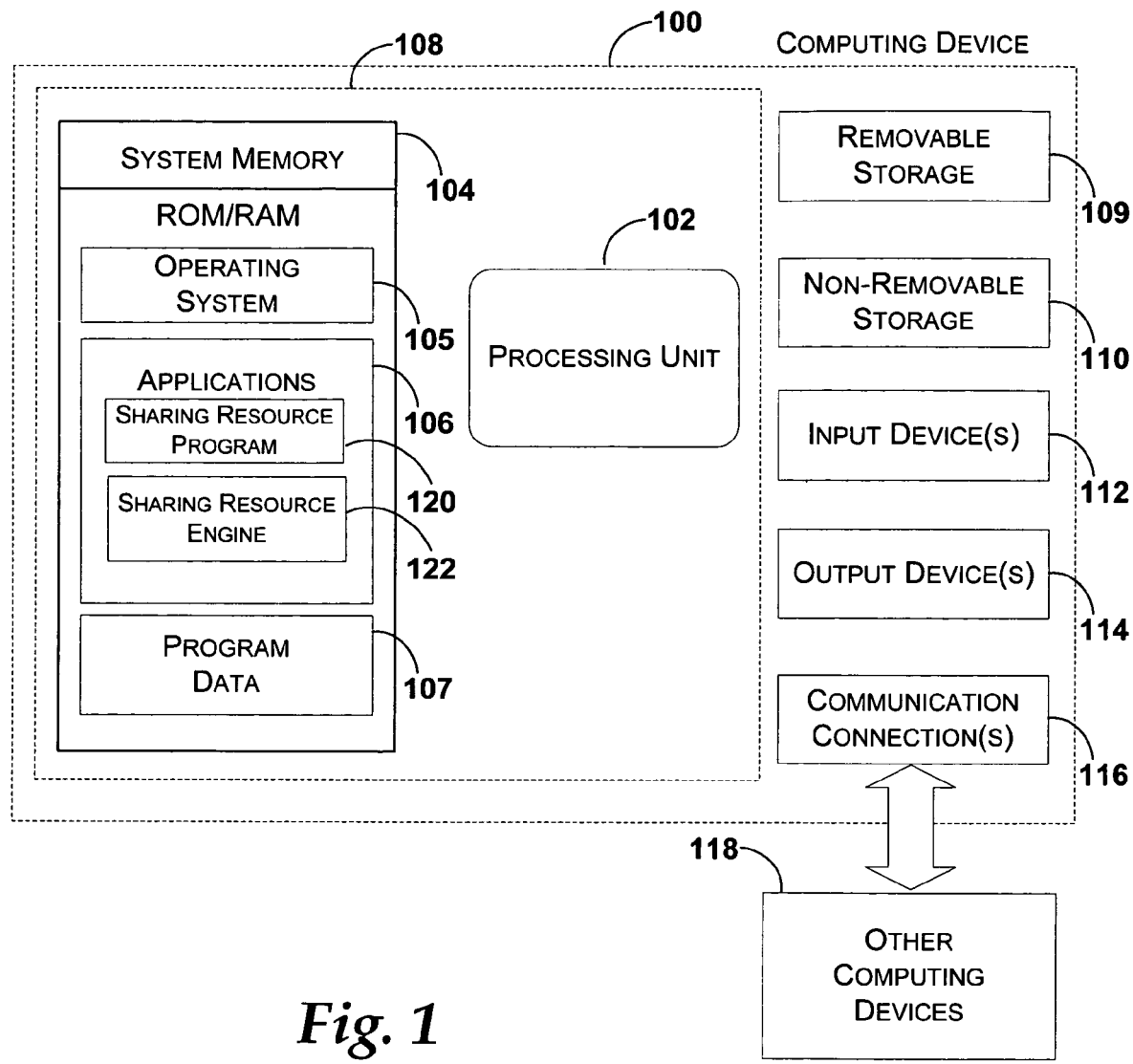
FIG. 1 illustrates an exemplary computing device that may be used in exemplary embodiments of the present invention.

Referring now to the drawings, in which like numerals represent like elements, various aspects of the present invention will be described. Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

With reference to FIG. 1, one exemplary system for implementing the invention includes a computing device, such as computing device 100. Computing device 100 may be configured many different ways, including but not limited to a desktop computing device and a mobile computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a sharing resource program 120 and a sharing resource engine 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate (wired and/or wirelessly) with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
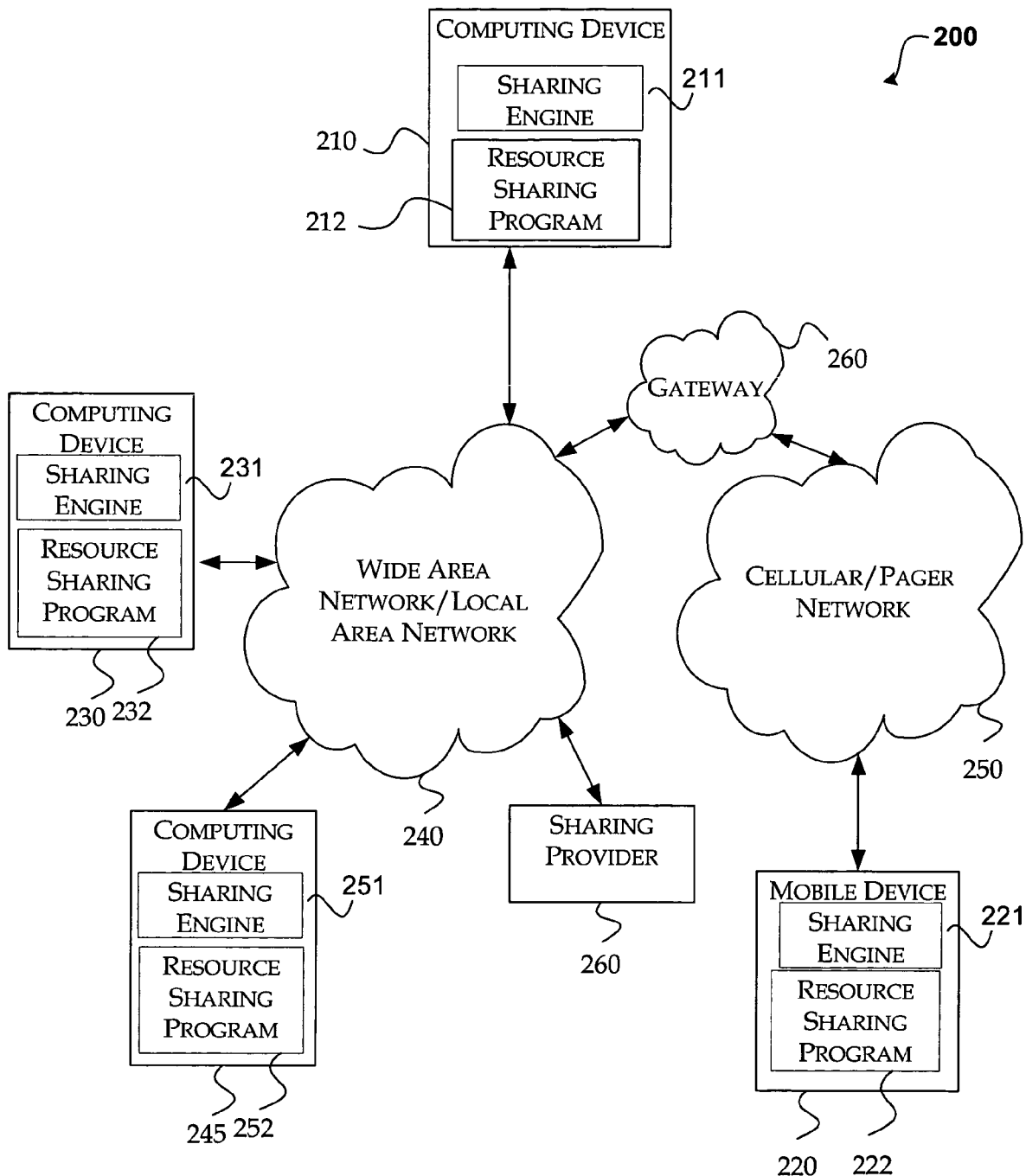
FIG. 2 is a functional block diagram generally illustrating a resource sharing system.

FIG. 2 is a functional block diagram generally illustrating a resource sharing system 200, in accordance with aspects of the invention. Computing devices 210, 220, 230 and computing device 245 are computing devices such as the ones described in conjunction with FIG. 1.

Sharing resource applications 212, 222 and 232 residing on the computing devices are configured to allow the sharing of resources. The applications may communicate using any one of several client-server protocols.

The shared resources may be transmitted over a wide area network (WAN)/local area network (LAN) 240. Cellular/pager network 250 is a network responsible for delivering messages to and receiving messages from wireless devices. The cellular/pager network 250 may include both wireless and wired components. For example, cellular/pager network may include a cellular tower that is linked to a wired telephone network. Typically, the cellular tower carries communication to and from cell phones, long-distance communication links, and the like.

Gateway 260 routes messages between cellular/pager network 250 and WAN/LAN 240. For example, a computer user may send a message that is addressed to a cellular phone. Gateway 260 provides a means for transporting the message from the WAN/LAN 240 to cellular/pager network 250. Conversely, a user with a device connected to a cellular network may be browsing the Web. Gateway 260 allows hyperlink text protocol (HTTP) messages to be transferred between WAN/LAN 240 and cellular/pager network 250.

The sharing engines (211, 221, 231, and 251) are designed to manage and direct various sharing providers, such as sharing provider 260, articulate information about sharing relationships, and to provide a framework for pluggable data sharing, data discovery, schema translation, and conflict resolution. This allows for common sharing operations to be implemented in a more centralized fashion, and eases the cost of implementing new providers. The sharing engine may be included within each computing device, or may be included on a server (not shown) that may be accessed by the other computing devices.

The sharing engines are a global resource that provide entry to all sharing mechanisms and relationships. The sharing engine is called upon to enumerate available or known providers for the purpose of showing the user what sharing options are available, or which providers can be used to share a specific item. Some providers are internal, and are known at compile time. Other providers can be plugged in via the object model if they support the correct interfaces.

According to one embodiment, the sharing engine is a singleton within the codebase of the resource sharing program (212, 222, 232 and 252). According to this embodiment, the sharing engine is constructed once when it is first accessed, exists through the lifetime of the session for the resource sharing program, and is destructed when the sharing program exits. According to another embodiment, the sharing engine may be started at any time and may exist within some program and/or exist on it's own. The publisher of data that is shared can control frequency of sync to some degree using a Time-To-Live ("TTL") value which represents how 'fresh' the data is in general. For example: If the user publishes new content daily, then the TTL should be set to 24 hours. A user, such as a server administrator may also specify a maximum subscription frequency for the server (or per subscription). This allows an admin who is not in control of published content to limit the load on the server during peak times. The user may also specify a maximum publishing frequency for the server (or per published object). This allows an admin to control how much data is pushed to the server and how frequently. This also allows the user to manage load on the server during peak times.

The sharing engine and sharing providers may be set to log with varying degrees of detail based the value of an "Enable Logging" key. This key may be modified at any time.

Figure 3:
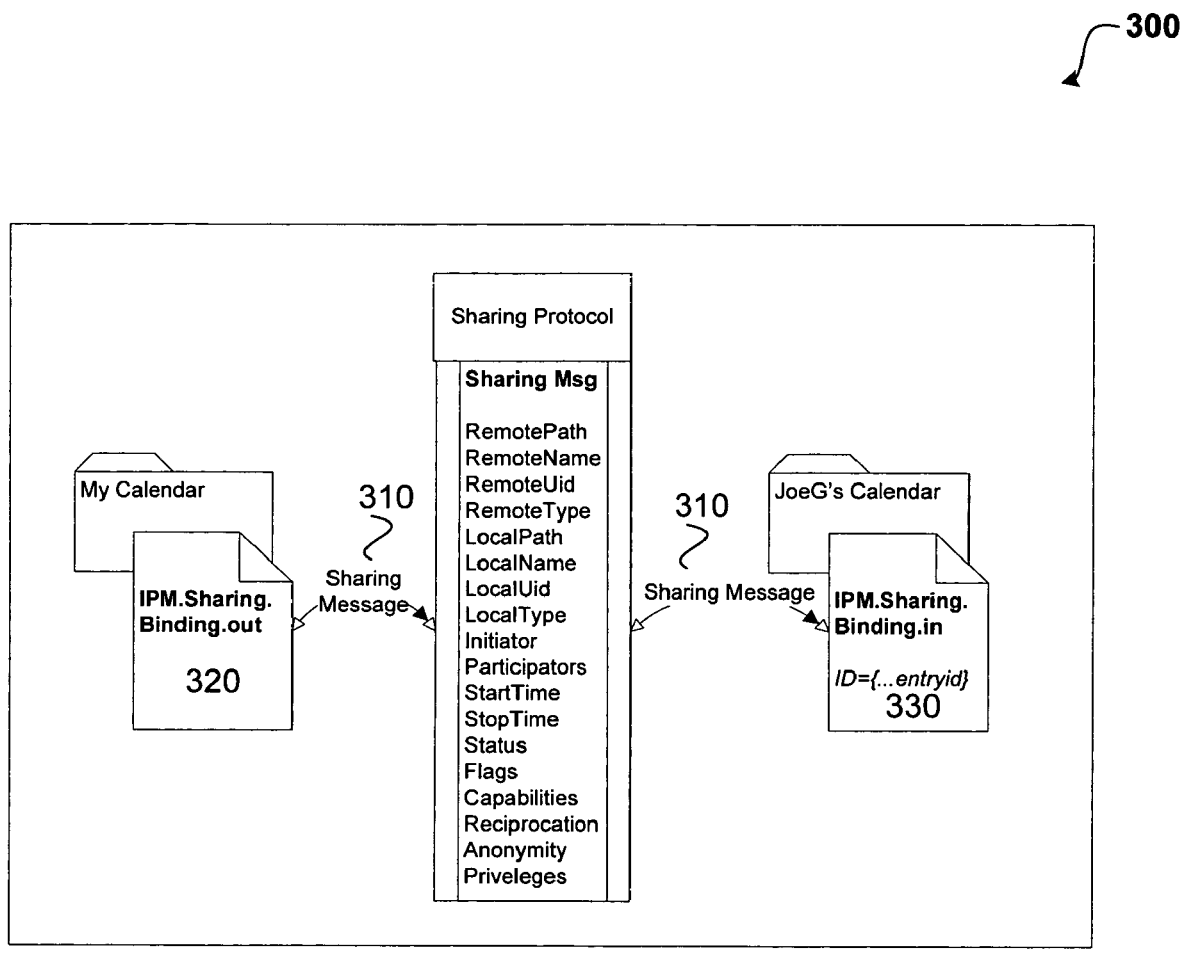
FIG. 3 illustrates bindings and configurations using the sharing message.

FIG. 3 illustrates bindings and configurations using the sharing message; in accordance with aspects of the invention.

Sharing relationships are transported using a Sharing Message (310). The Initiator provides some of the properties (attributes of the remote data, store, and permissions) and the Participator adds to the supplied properties (attributes of the local data and store) to establish the sharing relationship. The following table shows exemplary settings for the sharing relationship context.

Initiator Sharing Properties:

| Prop | Type | Notes |
| --- | --- | --- |
| Instance ID | GUID | Unique ID for this sharing relationship instance |
| State | DWORD | State of this relationship (established, pending . . .) |
| Provider Guid | GUID | Unique GUID identifying the sharing provider |
| Provider Name | Unicode | Display Name of Provider |
| Provider URL | Unicode | URL/path to download provider, or get more info. |
| Remote Path | Unicode | URL/path to remote data (share space) |
| Remote Name | Unicode | Friendly Name of remote data source |
| Remote ID | Unicode | Unique ID of remote data |
| Remote Type | Unicode | Content Type of remote data (e.g. "text/calendar") |
| Initiator Name | Unicode | Friendly name of the Initiator |
| Initiator SMTP | Unicode | smtp address of Initiator (user@domain.com) |
| Start Date | DateTime | Date when valid sharing starts |
| Stop Date | DateTime | Date when valid sharing stops |
| Filter | Restriction | Filter |
| Flags | DWORD | Flags for Access, Anonymity, and Reciprocation |
| ExtensionXml | Unicode | <structured provider-specific settings> |
| ExtensionBin | Binary | <blob provider-specific settings> |

These properties comprise part of the SharingRelationshipContext (SHRECX) that is described more fully below. According to one embodiment, the initiator stores these properties in an associated message of type "IPM.Sharing.Binding.out" (320) on the source resource.

According to one embodiment, the Participator receives these properties in the Sharing Message. When the sharing or the resource takes place using a Share Space, then the Initiator publishes these settings along with the remote data, perhaps encoded in the URL, or in the payload of published data.

In the process of accepting and establishing the relationship, several other properties are added by the Participator. These may include:

Participator Sharing Properties:

| Prop | Type | Notes |
| --- | --- | --- |
| Local Path | Unicode | Path to locally replicated data |
| Local Name | Unicode | Friendly Name of locally replicated data |
| Local Uid | Unicode | Unique Id of locally replicated data |
| Local Type | Unicode | Local content type (e.g. "IPF.Appointment") |
| Sync Settings | SyncGroupID | Account-like sync settings (possibly a reference to the Sync Group, rather than the raw data) |

The Participator remembers these properties as the context of what is being shared. These are stamped on the resource (in an associated message "IPM.Sharing.Binding.in") (330) that syncs with the remote data. Once accepted by the user and stamped onto a folder, this relationship is referred to as a binding.

The following are exemplary sharing message classes for sharing messages, such as sharing messages 310:

| Message Class | Description |
| --- | --- |
| IPM.Sharing.Parcel | Initiator's message to establish sharing with participator (data flows from Initiator to Participators) |
| IPM.Sharing.SASE | Initiator's message for participator to reciprocate sharing (data flows from Participators to Initiator) {SASE = self-addressed-stamped-envelope} |
| IPM.Sharing.Parcel.SASE | Sharing Parcel with an SASE. (data flows both ways) |
| IPM.Sharing.Response.* | Response sent by a Participator back to Initiator. Derivations of this class will follow the meeting request model roughly by appending hints to determine if it was accepted or rejected. |
| IPM.Sharing.Revoke | Revoke sharing relationship - discontinue syncing |
| IPM.Sharing.Update | When critical parts of the relationship change, this message is sent to participants so that they can update their client configurations. |

The IPM.Sharing.Parcel is a delivery of data sharing that does not encourage or require reciprocation. For example: user Alfa sends user Bravo a calendar via a Parcel. Bravo can now view the shared data.

The IPM.Sharing.SASE is a delivery without data, but includes a request to reciprocate data. For example: user Charlie asks user Delta to "please send their calendar info" via a SASE. Delta cannot access new data, but is requested to grant access to Charlie.

The IPM.Sharing.Parcel.SASE message is a combination delivery of actual data with a request to reciprocate. For example: user Echo sends their calendar to user Foxtrot and also requests that Foxtrot send a calendar back to Echo. In this case, Foxtrot has new data to view, but is also asked to reciprocate.

The IPM.Sharing.Response.* message is a method of communicating back to the initiators to track the establishment of sharing relationships.

The IPM.Sharing.Revoke message is a method of ceasing the sharing relationship and cleaning up any active links or references to the shared data, where appropriate.

The IPM.Sharing.Update message is sent to participators whenever the Initiator alters something critical about the sharing relationship—such as: source location, permissions, etc. This type of message is seen as more of a notification, and typically does not change the state of the sharing relationship. If the update alters the remote location, or some other piece of critical binding datum, a full resync may be triggered.

Although these are shown as separate message classes they may be implemented as a single message class wherein an identifier is used to indicate the type of sharing, such as: Parcel; SASE; Parcel.SASE; Response; Revoke; Update; and the like.

Referring now to FIGS. 4-8, illustrative processes for sharing a resource will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Figure 4:
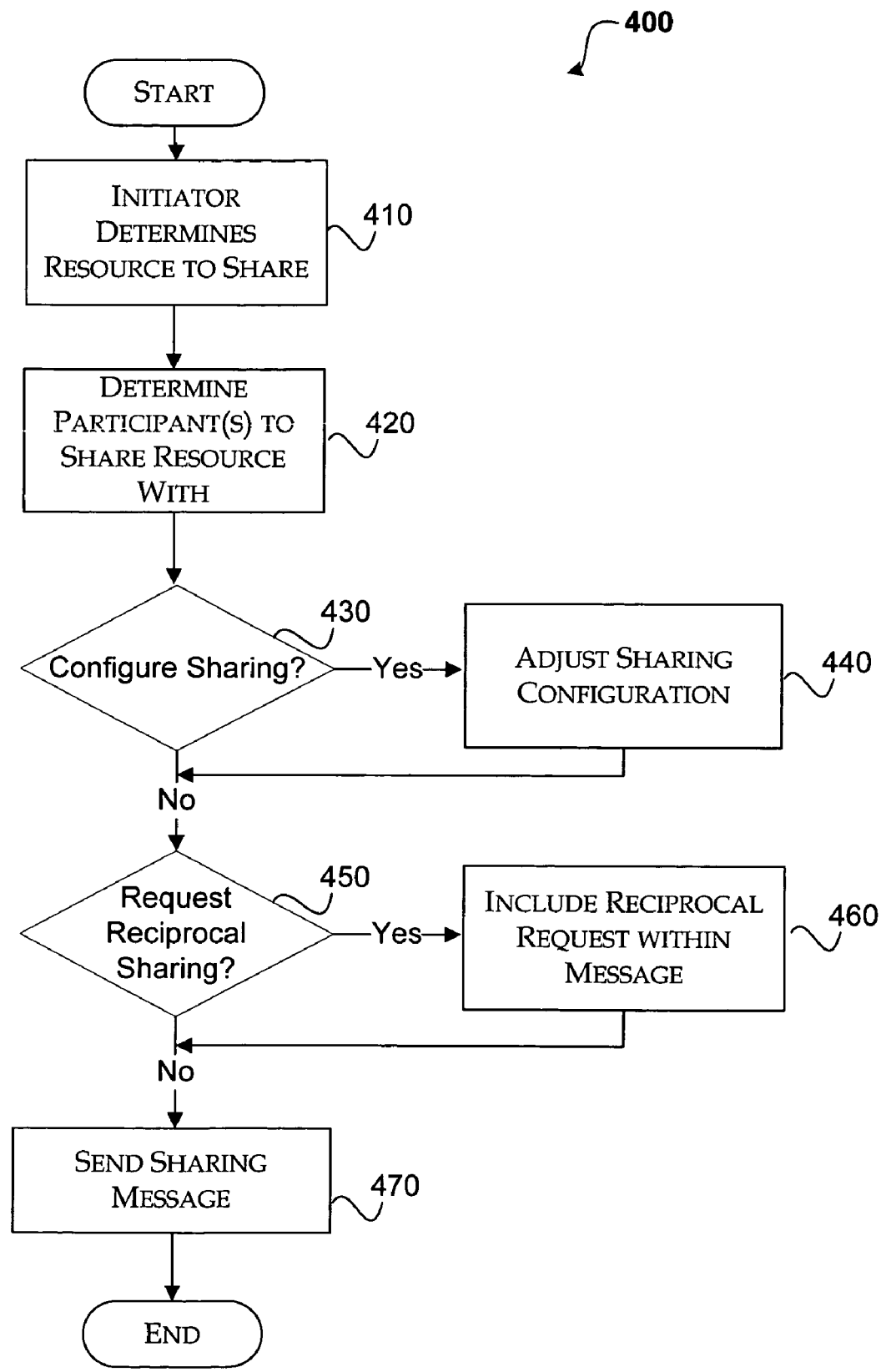
FIG. 4 illustrates a process for establishing resource sharing.

FIG. 4 illustrates a process for establishing resource sharing, in accordance with aspects of the invention.

After a start block the process moves to operation 410, where a user (the "initiator") decides the resource that they would like to share with another user(s) (the "participant(s)"). According to one embodiment, the shared resource may be a calendar, a tasks list, and a contacts list. Other computer resources may also be shared. For example, a folder, a device, and the like may be shared.

At operation 420, the initiator designates the participant(s) with whom they would like to share the resource. The participant may be any user that is coupled to the initiator through electronic means. For example, the user may be on the same network as the initiator, or the user may be located on a different network.

Moving to decision operation 430, a determination is made as to whether the initiator desires to configure settings associated with the resource. According to one embodiment, the user may limit the information shared with the user. For example, the initiator may only want to share public meetings and events with the participants while keeping their private data from being shared.

When the initiator desires to adjust the sharing configuration, the process moves to operation 440 where the initiator may configure the sharing settings.

When the initiator does not desire to adjust the sharing configuration, the process moves to decision operation 450, where the initiator may decide whether to request reciprocal sharing with the participant. Reciprocal sharing allows not only the participant to view the initiator's resource but it also allows the initiator to view the participant's resource.

When the initiator requests reciprocal sharing, the process moves to operation 460, where the reciprocal sharing request is added to the sharing message.

When the initiator does not desire to have reciprocal sharing the process moves to operation 470.

At operation 470, the sharing message is sent to the participants. When the initiator does not desire for the participants to reciprocally share, the participants are sent a sharing message stating that they have permission to view the resource. When the initiator desires to reciprocally share, the sharing request sent to the participants includes a message asking them to either accept or decline the reciprocal sharing request. If the participant accepts, an accept message is sent to the initiator with the ability for the initiator to view the shared resource. If the participant declines, the participant has the ability to send a note along with a decline message stating that the request has been rejected.

The process then moves to an end block and returns to processing other actions.

Figure 5:
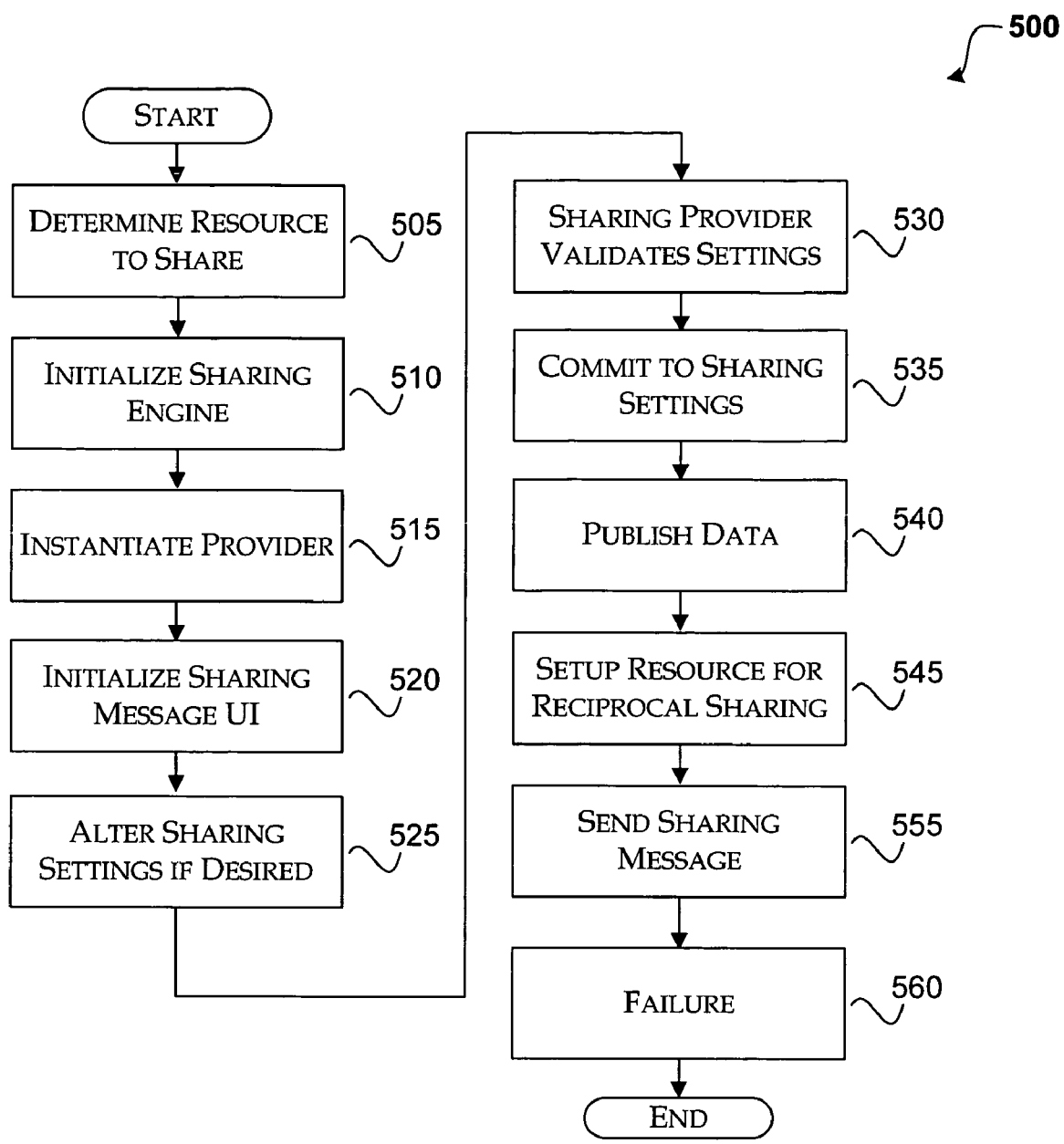
FIG. 5 shows a process for Initiator-Participator sharing.

FIG. 5 shows a process for Initiator-Participator sharing, in accordance with aspects of the present invention. Generally, Initiator-Participator Sharing takes place between users. The initiating user (the Initiator) begins the process by creating a Sharing Message and addressing it to the potential participators. The Sharing Message carries the Initiator's sharing properties to the potential participant(s). The states for Initiator-Participator sharing begin with the Initiator as follows.

| # | State | Description |
|---|---|---|
| 505 | Initiator Selects Resource | Resource Select in context or prior to Sharing Message UI |
| 510 | Sharing Engine Access | |
| 515 | Provider Instantiation | ShEng instantiates specific provider |
| 520 | Sharing Message UI | ShEng inits common UI, provider inits specific settings |
| 525 | User Selects | User allowed to alter provider, recipients, and settings |
| 530 | Provider Validation | Provider validates settings against resource & recipients |
| 535 | User Commits | User submits message, committing the sharing settings |
| 540 | Publish Data | Provider publishes to remote location (if necessary) |
| 545 | Set Expectations | Setup resource or other holding places for back sharing |
| 555 | Send Sharing Message | Sharing Message sent to reachable recipients |
| 560 | Failure Case | Suggest alternatives for unshareable recipients |

During the composition of the sharing Message, the states shown in operations 525-535 may be visited several times. When the participants of the message change, provider validation occurs and feedback is given to the user. The sharing engine may negotiate different sharing settings until sharing is successful with the participants.

The publishing of the data (operation 540) does not occur until the sharing message can be successfully sent to at least one of the participants. The sharing properties are also stamped onto the resource being shared so that the sharing relationship can be managed, altered, or removed.

In the case that not all participants were able to be shared with using the selected provider, the process may return to operation 515. At operation 515, the sharing engine chooses a more appropriate provider and repeats the process until all participants have been shared with or the initiator cancels the process.

Figure 6:
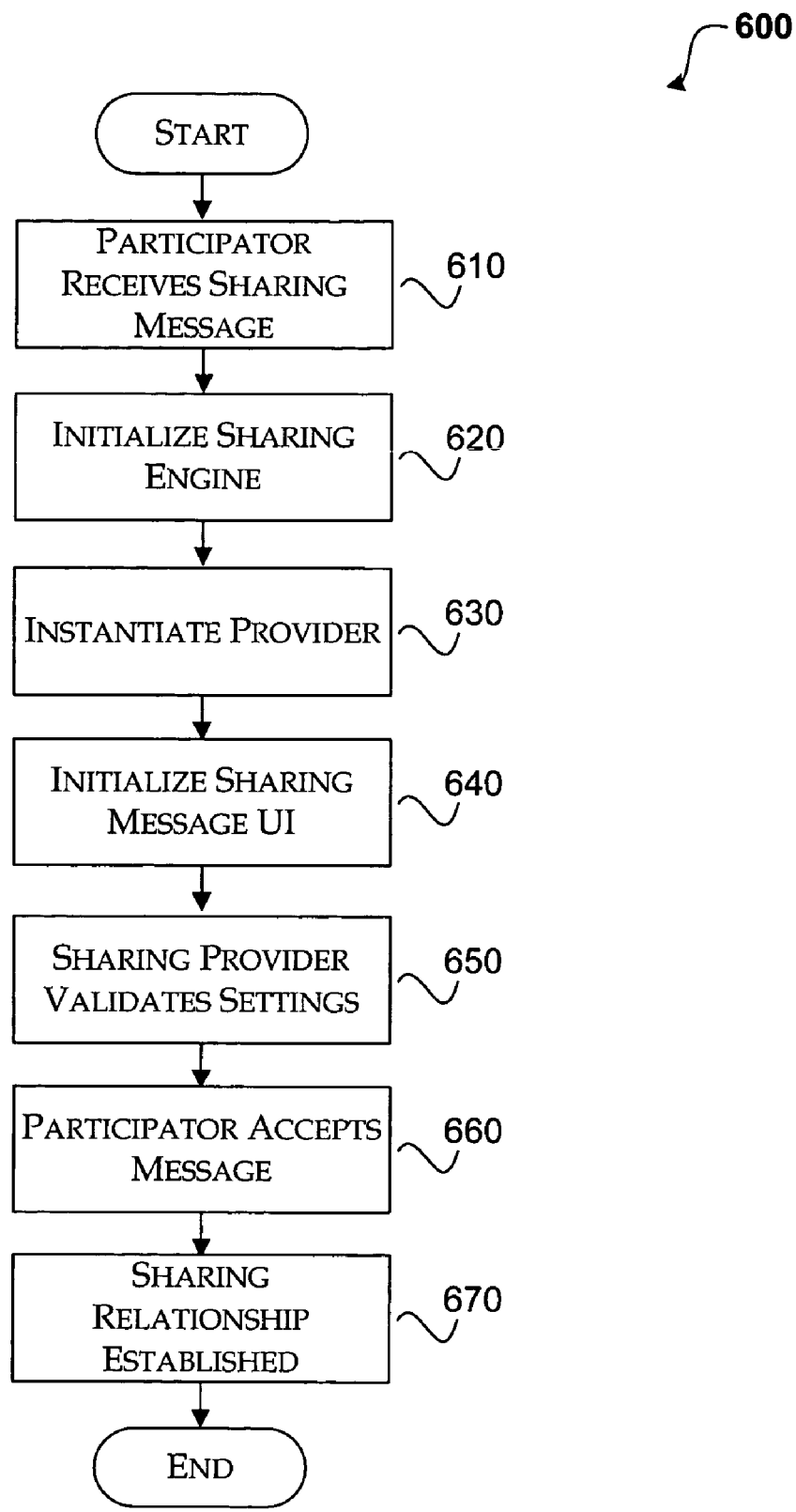
FIG. 6 illustrates the process once the sharing message is received by the participant.

FIG. 6 illustrates the process once the sharing message is received by the participant, in accordance with aspects of the invention. Once the sharing message is received by the Participator, the protocol continues as follows:

| # | State | Description |
|---|---|---|
| 610 | Participator Receives Sharing Message | Participator opens the Sharing Message |
| 620 | Sharing Engine Access | Sharing Engine initialized with info from message |
| 630 | Provider Instantiation | ShEng instantiates specific provider |
| 640 | Sharing Accept UI | ShEng inits common UI, provider inits specific settings |
| 650 | Provider Validation | Provider validates URL configuration |
| 660 | User Commits | User accepts parcel, committing the sharing settings |
| 670 | Relationship Established | Settings written to resource, data synced to client |

In operation 660, the configuration information is stamped on the folder or account so that it can be managed and reconfigured as appropriate. In this case, the sharing context is stored as a message with a "IPM.Sharing.Binding.out" message class. This message is created in the associated table of the published folder.

As detailed herein, Indices are also created to match these .in and .out bindings. According to one embodiment, the hidden messages exist in the associated table of the default store's Inbox, and therefore they roam with the user from client to client. External indices are also generated in the sharing.xml.obi file to match the bindings and indices.

At operation 670, the sharing relationship properties are stamped on the folder where the synchronization is configured. That is, they are saved onto an associated message where they can be retrieved again when necessary.

Figure 7:
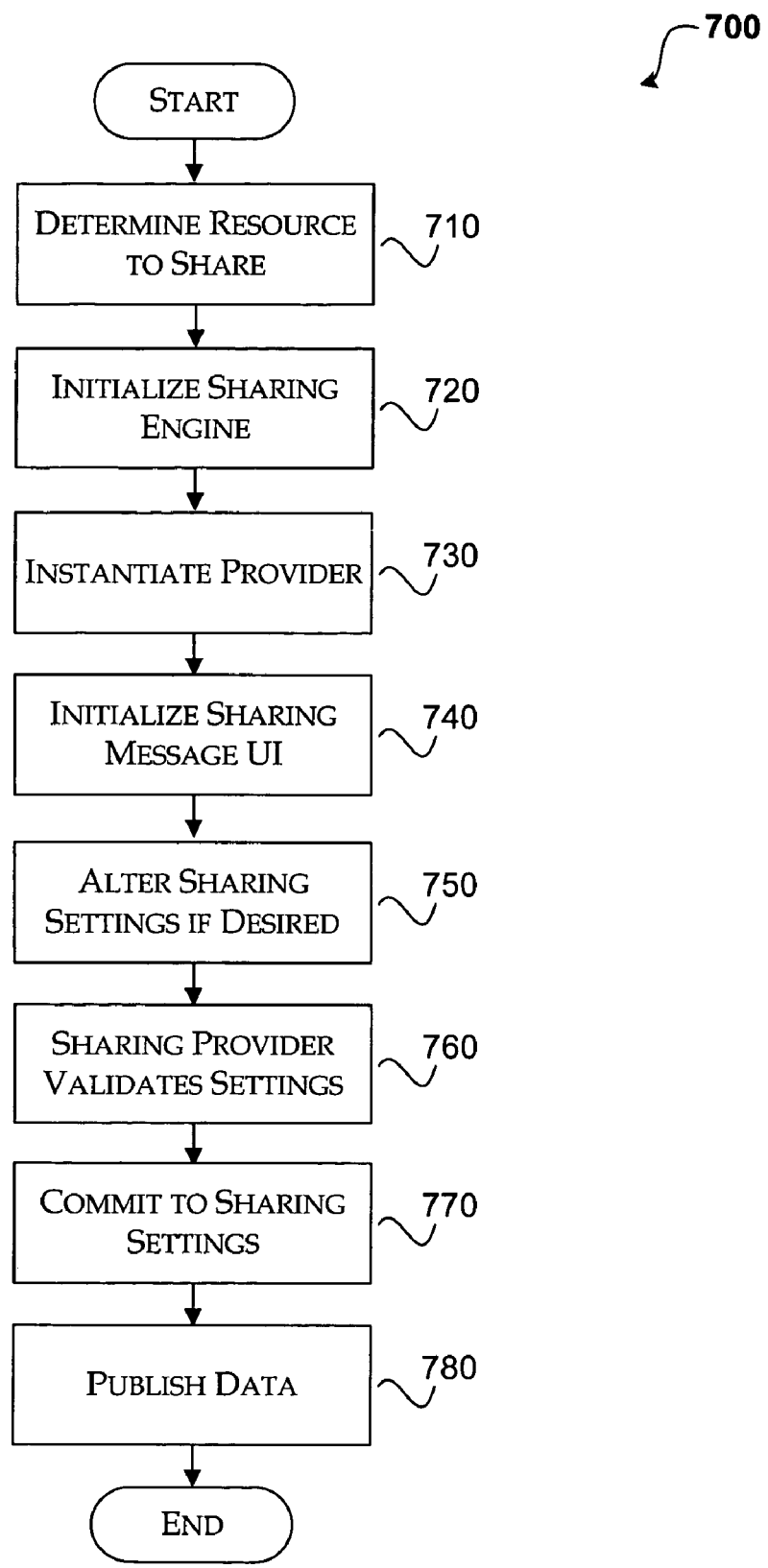
FIG. 7 shows a process for Initiator-Space sharing.

FIG. 7 shows a process for Initiator-Space sharing, in accordance with aspects of the invention. Publishing is simply the act of an Initiator pushing shared data out to a remote location or device (Share Space) without necessarily requesting any participants. In some cases participants will find the sharing space and voluntarily participate by interacting with that shared resource.

Publishing may also have intrinsic value beyond the subsequent Space-Participator sharing (which may or may not occur). For instance, publishing a calendar may generate an HTML-viewable calendar in addition to a payload iCal. Participators may then choose to simply view the calendar in web form rather than engage in a sharing relationship.

The process for Initiator-Space sharing is similar to the process for Initiator-Participator sharing as described above in conjunction with FIG. 5.

| # | State | Description |
|---|---|---|
| 710 | Initiator Selects Resource | Resource Select in context or prior to Sharing Message UI |
| 720 | Sharing Engine Access | Sharing Engine initialized with resource & context info |
| 730 | Provider Instantiation | ShEng instantiates specific provider |

-continued

| # | State | Description |
|---|---|---|
| 740 | Sharing Message UI | ShEng inits common UI, provider inits specific settings |
| 750 | User Selects | User allowed to alter provider, Space, and settings |
| 760 | Provider Validation | Provider validates settings against resource & Space |
| 770 | User Commits | User submits parcel, committing the sharing settings |
| 780 | Publish Data | Provider publishes to Sharing Space (or Device) |

At operation 780, the configuration information is stamped on the resource or account so that it can be managed and reconfigured as appropriate.

Figure 8:
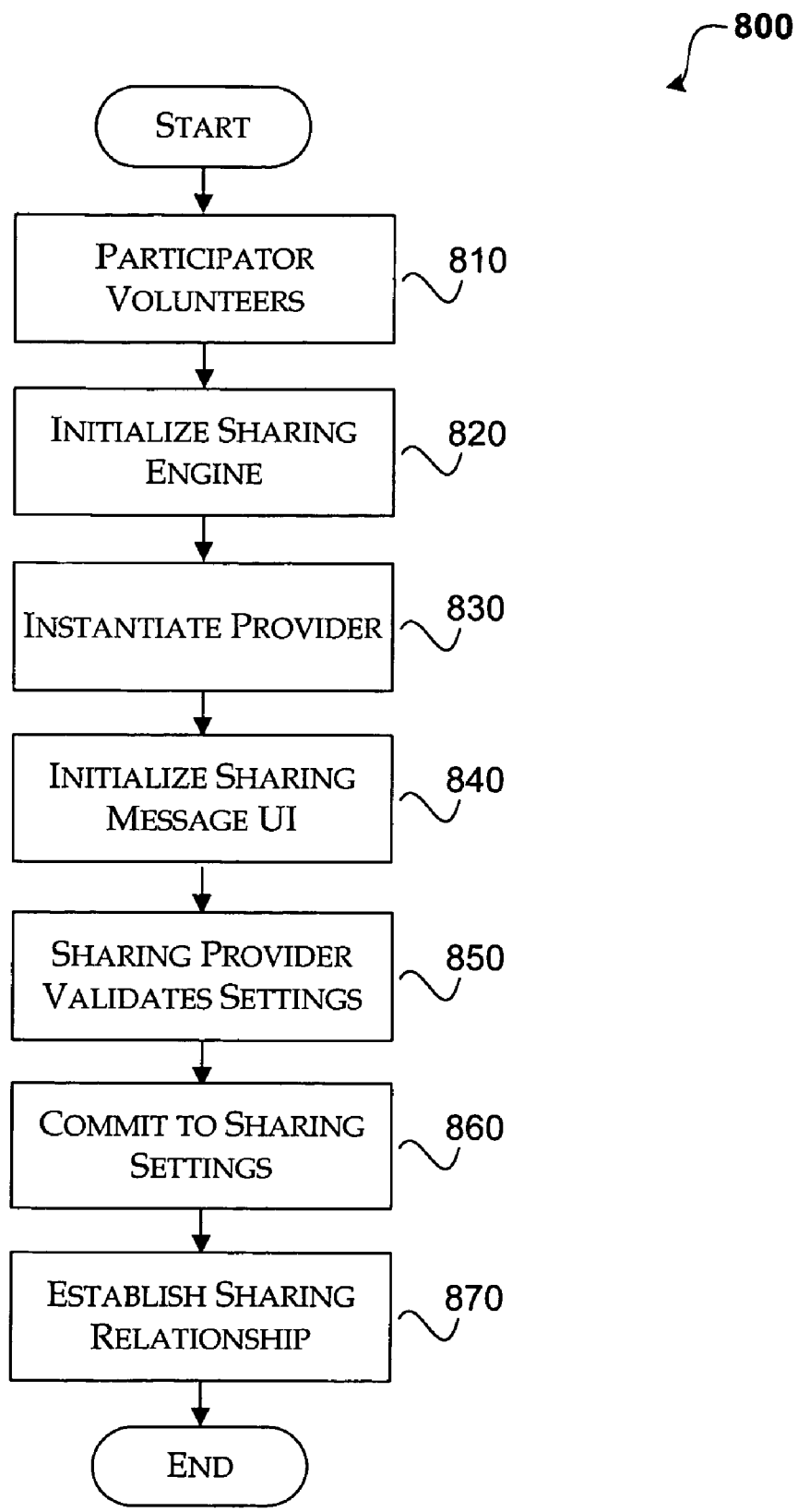
FIG. 8 shows a process for Space-Participator sharing.

FIG. 8 shows a process for Space-Participator sharing, in accordance with aspects of the invention. Space-participator sharing takes place when a participator locates a sharing space and voluntarily establishes a sharing relationship without any Initiator involvement. This typically happens when the user browses a website and clicks a URL hyperlink that is supported by the sharing engine or one of its providers.

The states for Space-Participator sharing are similar to the process described in conjunction with FIG. 6 above.

| # | State | Description |
|---|---|---|
| 810 | Participator Volunteers | User navigates to Share Space and clicks sharing Link |
| 820 | Sharing Engine Access | Sharing Engine initialized with URL context info |
| 830 | Provider Instantiation | ShEng instantiates provider that handles URL |
| 840 | Sharing Accept UI | ShEng inits common UI, provider inits specific settings |
| 850 | Provider Validation | Provider validates URL configuration |
| 860 | User Commits | User accepts parcel, committing the sharing settings |
| 870 | Relationship Bound | Settings written to resource, data synced to client |

When an initiator wants to end the sharing relationship, the initiator sends a revocation message with the shareID of the original relationship. The participator receives this message, and when they open it, the Sharing Relationship is marked as REVOKED. When the Sharing Relationship is REVOKED, the folder no longer syncs to the remote data source, and the user is notified of the revoked status. This notification may occur at many different points, for example, the notice may delayed for a period of time, the notice may be immediate, and the like. The sharing engine may also try to clean up the cached data.

The sharing engine marks Sharing Relationships as EXPIRED when the end date has passed for sharing relationships which specify an end date. This may or may not occur immediately upon expiration. For example, this may occur when the folder is accessed and the sharing engine notes the expiration date. This may also occur during Rationalization.

The following tables illustrate exemplary Sharing Relationship Profiles.

Exchange Initiator to Participator Sharing

Sample valid values for the Sharing relationship context structure:

| Prop | Value |
|---|---|
| Instance Uid | {F458EB88-2753-41AE-BFE9-9622C94F53E8} |
| Provider Guid | {AC898543-505F-499F-8DE9-21D15805447E} |
| Provider Name | Exchange Server |
| Remote Path | STORE_ROOT\Calendar\projects\ |
| Remote Name | Ren & Stimpy |
| Remote Uid | {... entry ID of folder ...} |
| Remote Type | IPF.Appointment |
| Initiator Name | Joe Gish |
| Initiator SMTP | joegish@xxx.com |
| Initiator EID | {... entry ID of redmond\jgish ...} |
| Start Date | May 27, 2004 |
| End Date | May 27, 2005 |
| Local Type | IPF.Appointment |

Sharepoint Initiator to Participator Sharing

Sample valid values for the Sharing relationship context structure:

| Prop | Value |
|---|---|
| Instance Uid | {F458EB88-2753-41AE-BFE9-9622C94F53E8} |
| Provider Guid | {6235425B-542C-4E1E-878D-B2FBA2D66047} |
| Provider Name | Windows Sharepoint Services |
| Configuration URL | stssync://wss/?ver=1&site-name=Ren... |
| Remote Path | http://office/c92/Ren_Stimpy/list.aspx |
| Remote Name | Ren & Stimpy |
| Remote Uid | {... list GUID ...} |
| RemoteType | "calendar" |
| Initiator Name | Joe Gish |
| Initiator Smtp | joegish@xxx.com |
| Initiator Eid | {... eid for Redmond\jgish ... } |
| Start Date | May 27, 2004 |
| End Date | May 27, 2005 |
| Local Path | Office\12.0 |
| Local Name | Outlook Team Site |
| Local Uid | {... entryID of the local folder ...} |
| Local Type | IPF.Appointment |

World-Wide Web "Reach" Initiator to Participator Sharing

Sample valid values for the Sharing relationship context structure:

| Prop | Value |
|---|---|
| Share Uid | {F458EB88-2753-41AE-BFE9-9622C94F53E8} |
| Provider Guid | {8D7E04D9-FBA1-489C-B432-32120B3B7D75} |
| Provider Name | World Wide Web |
| Configuration URL | webcal://verizon.net/mysebspace/waycooljr.ics |
| Remote Path | http://verizon.net/mywebspace/waycooljr |
| Remote Name | Ren & Stimpy |
| Remote Uid | {... iCal Guid ...} |
| Remote Type | text/calendar |
| Initiator Name | Joe Gish |
| Initiator Smtp | joegish@xxx.com |
| Start Date | May 27, 2004 |
| End Date | May 27, 2005 |
| Local Path | Web Calendars\Ren |
| Local Name | Rush XXX Reunion Tour Calendar |
| Local Uid | {... entryID of the local folder ...} |
| Local Type | "IPF.Appointment" |

Figure 9:
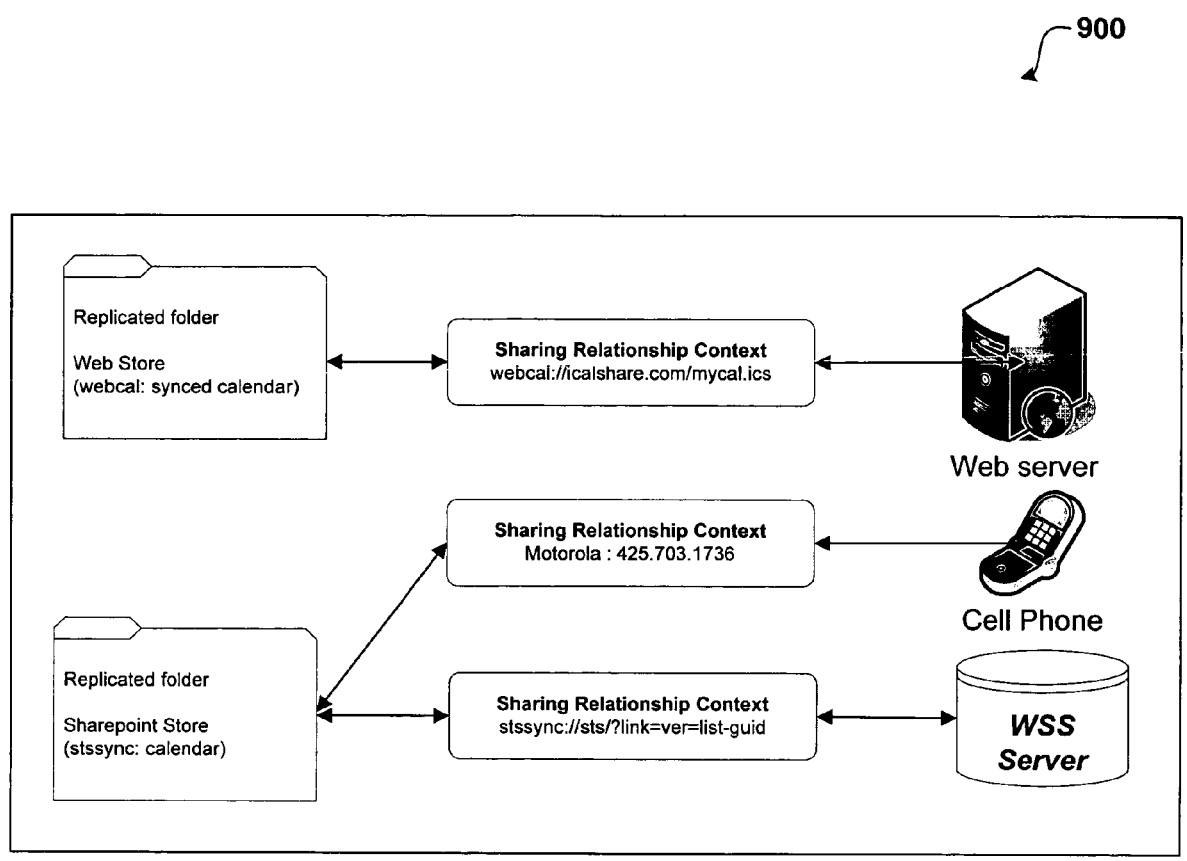
FIG. 9 illustrates sharing relationship context examples.

FIG. 9 illustrates sharing relationship context examples, in accordance with aspects of the invention.

Sharing Relationships are established to identify the context of a specific host data source, a local replica destination, a specific client user, and other attributes that the sharing resource program uses for management purposes such as sync settings and the like. Conceptually, there is one sharing relationship for every remote resource that is being replicated into the sharing resource program.

The ISharingRelationshipContext is used for Sharing relationship information and management. This configuration data is encapsulated into a SharingRelationshipContext which is used to serialize the configuration information in and out of a folder/message or a URL. Multiple sharing relationships can be associated with a single folder.

Figure 10:
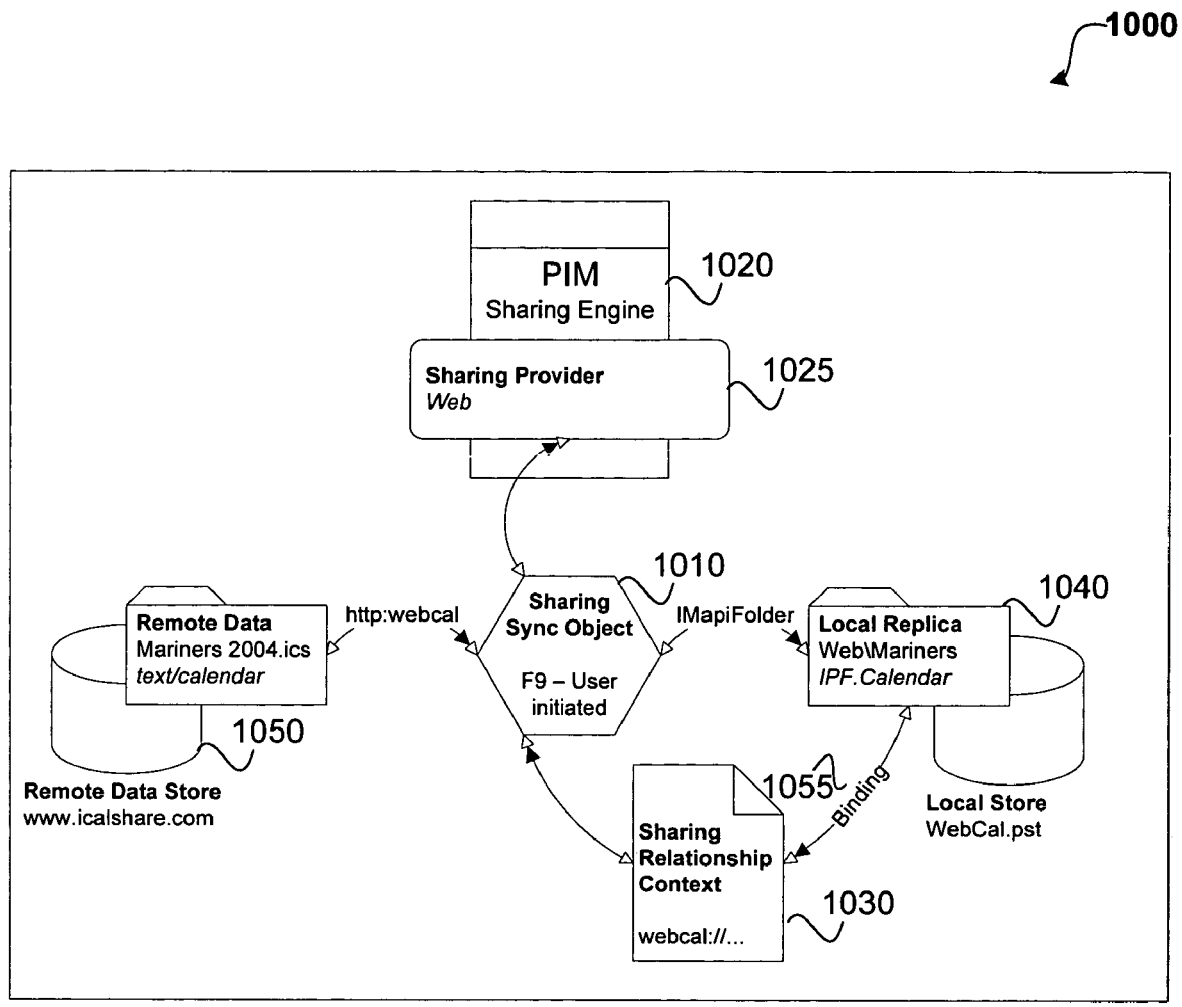
FIG. 10 illustrates a sharing synchronization diagram.

FIG. 10 illustrates a sharing synchronization diagram, in accordance with aspects of the invention. Sharing Sync Object 1010 includes various synchronization interfaces for tasks such as: synchronization management and instigation; synchronization with the local store; pull-synchronization for a replicator; resolving conflicts brought about during synchronization; and progress status and cancellation.

When a sharing relationship is synchronized, a Sync Object 1010 is instantiated by the provider and triggered by the Sharing Engine 1020. The Sync Object keeps a reference to the Sharing relationship context 1030, the Provider 1025, and the local replica 1040 during synchronization. The provider 1025 uses the sharing relationship context for information about the remote data source 1050, connection information, and the last time it was synchronized.

The Sharing relationship context 1030 describes the association between the remote data source and the local replicated copy. This context, when serialized or stamped onto a folder or message, is referred to as a "Binding" (1055). This information gives the provider a specific instance and context with which to do its work. A class which implements the sharing relationship context is provided. This class implements the ISharingRelationshipContext interface:

```
interface ISharingRelationshipContext
:   IUnknown
{
    HRESULT ReadFromURL(DWORD dwFlags, PCWSTR pwzURL);
    HRESULT BindIntoURL(DWORD dwFlags, BSTR* pbstr);
    HRESULT ReadFromMsg(DWORD dwFlags, IDispatch* pMsg);
    HRESULT BindIntoMsg(DWORD dwFlags, IDispatch* pMsg);
    HRESULT set_Prop(DISPID dispid, PWSTR pwz);
    HRESULT get_Prop(DISPID dispid, PWSTR pwz, int* pcch);
    ...other specific get/set prop methods...
};
```

ReadFromURL and BindIntoURL are designed to serialize the configuration information into and out of a URL for a supported protocol. For example, a context for a Sharepoint relationship would be called to ReadFromURL with an stssync: URL when launched from the browser. The provider would parse the various pieces of configuration from the URL and save them into the context. BindIntoURL would perform the opposite translation, generating an stssync: URL from the set of context properties.

ReadFromMsg and BindToMsg are designed to serialize the configuration information into and out of a message—either a hidden message in the associated folder of a local replica, or a sharing message that is sent to distribute the configuration context. For example, when syncing to a webcal:folder, the configuration information is saved into the associated message of the folder that the calendar syncs into. Also, if the user shares this link with someone else, the configuration information would be bound into a sharing message for transport. On the receiving end, these methods would also be used to read the configuration from the sharing message and consequently bind to the second user's sync folder.

The get_/set_accessors are used to push data in and out of the context.

The following is a more detailed look at the Sharing relationship context

```
(SHRECX)
typedef struct SSharingRelationshipContext // ShReCx
{
    DWORD       dwCaps;
    DWORD       dwFlavor;
    DWORD       dwStatus;
    DWORD       dwDetail;
    DWORD       dwAnonymity;
    DWORD       dwReciprocation;
    DWORD       dwPermissions;
    GUID        guidInstance;
    GUID        guidProvider;
    PCWSTR      pwzProviderName;
    PCWSTR      pwzProviderURL;
    PCWSTR      pwzConfigURL;
    PCWSTR      pwzRemoteName;
    PCWSTR      pwzRemotePath;
    PCWSTR      pwzRemoteUid;
    PCWSTR      pwzRemoteType;
    PCWSTR      pwzRemoteUser;
    PCWSTR      pwzRemotePass;
    FILETIME    ftRemoteLastMod;
    PCWSTR      pwzInitiatorName;
    PCWSTR      pwzInitiatorSmtp;
    SBinary*    pmbinInitiatorEid;
    PCWSTR      pwzParticipants;
    FILETIME    ftStart;
    FILETIME    ftStop;
    SRestriction resFilter;
    PCWSTR      pwzLocalPath;
    PCWSTR      pwzLocalName;
    PCWSTR      pwzLocalUid;
    PCWSTR      pwzLocalType;
    FILETIME    ftLocalLastMod;
    FILETIME    ftLastSync;
    DWORD       dwTimeToLive;
    DWORD       dwFlags;
    PCWSTR      pwzExtXml;
    PMBIN       pmbinExt;
} SHRECX, *PSHRECX;
```

The Caps (DWORD dwCaps) defines the capabilities of the sharing context and is represented by a bitmask of the ESharingContextCapabilitiesMask (esccm) enumeration.

The Flavor (DWORD dwFlavor) defines the "flavor" of this sharing context and is represented by a bitmask of the ESharingContextFlavorMask (escfm) enumeration.

The Status (DWORD dwStatus) includes the initial, tentative, and established states, in addition to expired and revoked. Provider-specific status can also be masked into the hiword of this value.

The Detail (DWORD dwDetail) roughly states the level of detail that should be included in this sharing relationship. According to one embodiment, the default enum is ESharingDetailLevel.

The Anonymity (DWORD dwAnonymity) value defines the anonymity controls for this context. See ESharingAnonymityFlag.

The Reciprocation (DWORD dwReciprocation) value defines the reciprocation controls for this context. See ESharingReciprocation flag.

The Permissions (DWORD dwpermissions) is a permission mask for what is to be granted or requested.

The Instance Uid (GUID guidInstanceUid) is a globally unique ID that identifies this sharing relationship instance. Subsequent sharing messages or revocations reference this unique ID for correlation purposes.

The Provider Guid (GUID guidProvider) is a GUID that identifies the type of provider that should be used to manage the synchronization and sharing relationship. The sharing engine uses this to instantiate the proper sharing provider.

The Provider Name (PCWSTR pwzProviderName) is a unicode string that reflects the name of the provider, adding context to situations where the provider cannot be found or installed. For instance, this string could be used in an error message stating that this provider is not found on the system.

The Provider URL (PCWSTR pwzProviderURL) is a URL that is intended to reference a provider's website. The website might have a link to install the provider, or other information for the user. If present, it provides more context than the provider name for error conditions (such as installation requirements).

The Config URL (PCWSTR pwzConfigURL) is the original configuration URL from whence this relationship was established. This is non-empty when the relationship actually came from a URL configuration.

The Remote Name (PCWSTR pwzRemoteName) is a friendly name of the remote data source. It might refer to file name, or simply display name. It may or may not be unique within the scope of the remote path.

The Remote Path (PCWSTR pwzRemotePath) is a URL or path that identifies where the data is stored remotely. The sharing provider uses this path to synchronize the data. This is the path component of a URL The Remote Uid (PCWSTR pwzRemoteUid) is an identifier that is the unique ID of the remote data source. If the remote name is not unique, then this ID should be what is relied on for clarification.

The Remote Type (PCWSTR pwzRemoteType) is a content type of the remote data. In practice, this value is somewhat provider specific, but it is recommended that MIME content types are used where possible. For instance, for a WebCal relationship, the value would be "text/calendar".

The Remote User (PCWSTR pwzRemoteUser) is a username that is used for authentication purposes with the remote server, this context can remember the "remote username" credentials used to access the data.

The Remote Pass (PCWSTR pwzRemotePass) stores the "remote password" credentials used to access the data when a username is used for authentication purposes with the remote server.

The Remote Last Mod (FILETIME ftRemoteLastMod) is the time and date of the last modification on the data, according to the server.

The Initiator Name (PCWSTR pwzInitiatorName) is the friendly name of the person who originated the invitation or publication of the shared data. This name and corresponding SMTP address are included at the sender's discretion.

The Initiator Smtp (PCWSTR pwzInitiatorSmtp) is an SMTP e-mail address of the person who originated the shared data. If there is any reason to allow the participator to contact the initiator, this would be desirable. In conjunction with Initiator Name, an erstwhile anonymous participator could give feedback, suggest alternatives, or contribute to the shared data out of band.

The Initiator Eid (SBinary* pmbinInitiatorEID) is the address book entry ID of the initiator, if they can be resolved in one of the address books. The Initiator friendly name and SMTP address are still cached here, even if the EntryID can be found. This way, if the Address Book entry ever becomes unreachable, the user has a fallback mechanism for locating the initiator.

The Participants (PCWSTR pwzParticipants) is a list of recipients who have been given a chance to share this data. Some providers will not be able to verify actual participation, and some sharing is anonymous. When present, this property is formatted the same as the TO field of the sharing message.

The Start Date (FILETIME* pftStartDate) is the date on which the sharing of data should begin. Prior to this date, access permissions and shared data will not be available. Providers can use this to restrict when the user may access the data. Not all providers support time-sensitive restrictions on sharing, in which case this value will be NULL. This information may also be used to render, enable, or disable appropriate UI elements to accurately express the initiator's intent.

The Stop Date (FILETIME* pftEndDate) is the date on which the sharing of data should end. After this date, access permissions and shared data will not be available. Providers can use this to restrict when the user may access the data. Not all providers support time-sensitive restrictions on sharing, in which case this value will be NULL. This information may also be used to render, enable, or disable appropriate UI elements to accurately express the initiator's intent.

The Filter (SRestriction resFilter) is a restriction filter for the data that is shared in or out according to MAPI rules. It is not necessary to include start and end dates in the filter, since they are handled separately. Not all providers support restricting or filtering data.

The Local Name (PCWSTR pwzLocalName) is a friendly name component of the of local data source path. It is typically the folder name of the local data copy. It need not be unique for our purposes. This is implied by the context of the folder in many cases.

The Local Path (PCWSTR pwzLocalPath) is a URL or path that tells the provider where the data is stored locally. This is the path component, and does not include the actual name or ID.

The Local Uid (PCWSTR pwzLocalUid) is an identifier that is the unique ID of the local data set. In the PST, this is an EntryID that points to the locally replicated folder.

The Local Type (PCWSTR pwzLocalType) is a content type of the local data. In MAPI, content types are specified by Content Classes, or "folder types" such as "IPF.Appointment" or "IPF.Tasks". These are mapped from the remote type.

The Local Last Mod (FILETIME ftLocalLastMod) is the time and date of the last modification on the data, according to the client.

The Last Sync (FILETIME ftLastSync) is the time and date of the last sync.

The TimeToLive (DWORD dwTimeToLive) is the number of minutes that the data should remain fresh. After this time, it may be stale and likely needs to be refreshed.

The Flags (DWORD dwFlags) is a provider-specific DWORD that is not used by the base provider or context mechanism. This is a simple way to extend the context in case all that is needed is a small number of states or flags.

The Binary Extensions (SBinary* pmbinExt) are any binary values that the provider might want to store. This is a slightly less structured way for extensions to be added to the sharing context.

The Xml Extensions (PCWSTR pwzProvDataXML) are any other provider-specific configuration setting which does not fit into the above properties should be XML-encoded in this property. This helps to ensure that extensions or 3$^{rd}$ party providers can correctly configure themselves even if new requirements or parameters are invented.

For Example: Suppose the worldwide web provider stores an alternate publishing path to fallback to in case an http: connection cannot be established:

```
<WWW_Provider version="2.0">
  <alt_pub_path type="ftp" URL="ftp.stillion.net/calendars"/>
</WWW_Provider>
```

Sharing Messages can make use of internet headers to transport sharing properties over e-mail.

Many properties in the SHRECX are translatable into "x-" header props for the internet message when it gets saved and submitted to the outbox. Properties 15 which make sense for the initiator are sent, and some properties cannot be accepted without verifying them against the remote data.

The following table shows exemplary properties that may be transmitted via MIME properties:

| SHRECX.property | x-field name |
| --- | --- |
| Provider Guid | X-Sharing-Provider-Guid |
| Provider Name | X-Sharing-Provider-Name |
| Provider URL | X-Sharing-Provider-URL |
| Config URL | X-Sharing-Config-URL |
| Remote Uid | X-Sharing-Remote-Uid |
| Remote Name | X-Sharing-Remote-Name |
| Remote Path | X-Sharing-Remote-Path |
| Remote Type | X-Sharing-Remote-Type |
| Instance Guid | X-Sharing-Instance-Guid |
| Capabilities | X-Sharing-Capabilities |
| Flavor | X-Sharing-Flavor |

In order to identify a message that contains any of these properties, the content type "Sharing" is specified in the content-type SMTP/MIME header.

Figure 11:
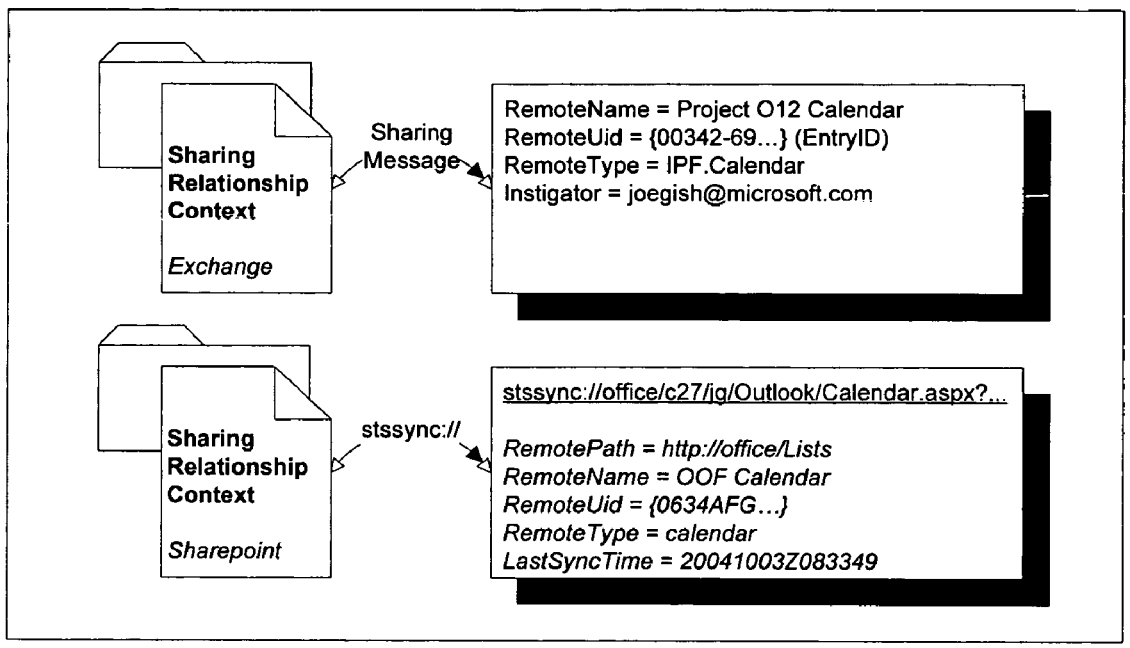
FIG. 11 shows sharing relationship context configuration.

FIG. 11 shows sharing relationship context configuration, in accordance with aspects of the present invention.

Sharing Providers may want to implement their own sharing relationship context derivatives. The sharing relationship context is primarily a way to distribute the context properties between bindings, providers, the sharing engine, and sync objects. The default context supports fairly general URL parsing (using a map) and general sharing property access.

A new sharing relationship context is created each time the user establishes a new sync relationship to a local folder. The context is written to the folder and remembered so that it can be referred to later. The context itself is saved in the associated table on the Folder in an "IPM.Sharing.Binding.*" message. The act of creating a new message of this class and saving it to the folder is referred to as "Binding." Likewise, removing a message from this table is considered "Unbinding."

There are two types of bindings: incoming and outgoing. Incoming bindings describe relationships with remote data that is not owned by the client, but is replicated locally. It is someone else's data that they are sharing with you. Outgoing bindings describe relationships with recipients or remote locations for data that is owned locally by the client. This is your data that you are sharing with others. These two data types are distinguished by the message classes "IPM.Sharing.Binding.in" and "IPM.Sharing.Binding.Out" respectively.

Folders can have multiple sharing relationships established, and therefore multiple contexts written. One of these relationships is designated as the primary relationship, and is prioritized first for synchronization. Certain providers may only support sync relationships when they act as the primary provider. Other providers might only support relationships where they are the sole provider. These restrictions are communicated using the Provider's internal Capability Flags.

The sharing engine (in conjunction with the sharing providers) is responsible for ensuring that duplicate contexts are not constructed on a folder. Each context is assigned a unique GUID, which can be used to reference the original configuration. When the user tries to bind the same configuration, the Sharing Engine detects the duplicate. If the configuration is URL based, the provider compares the URL to detect the duplicate. Rather than binding a duplicate relationship, the existing relationship is updated with any potentially new information.

Figure 12:
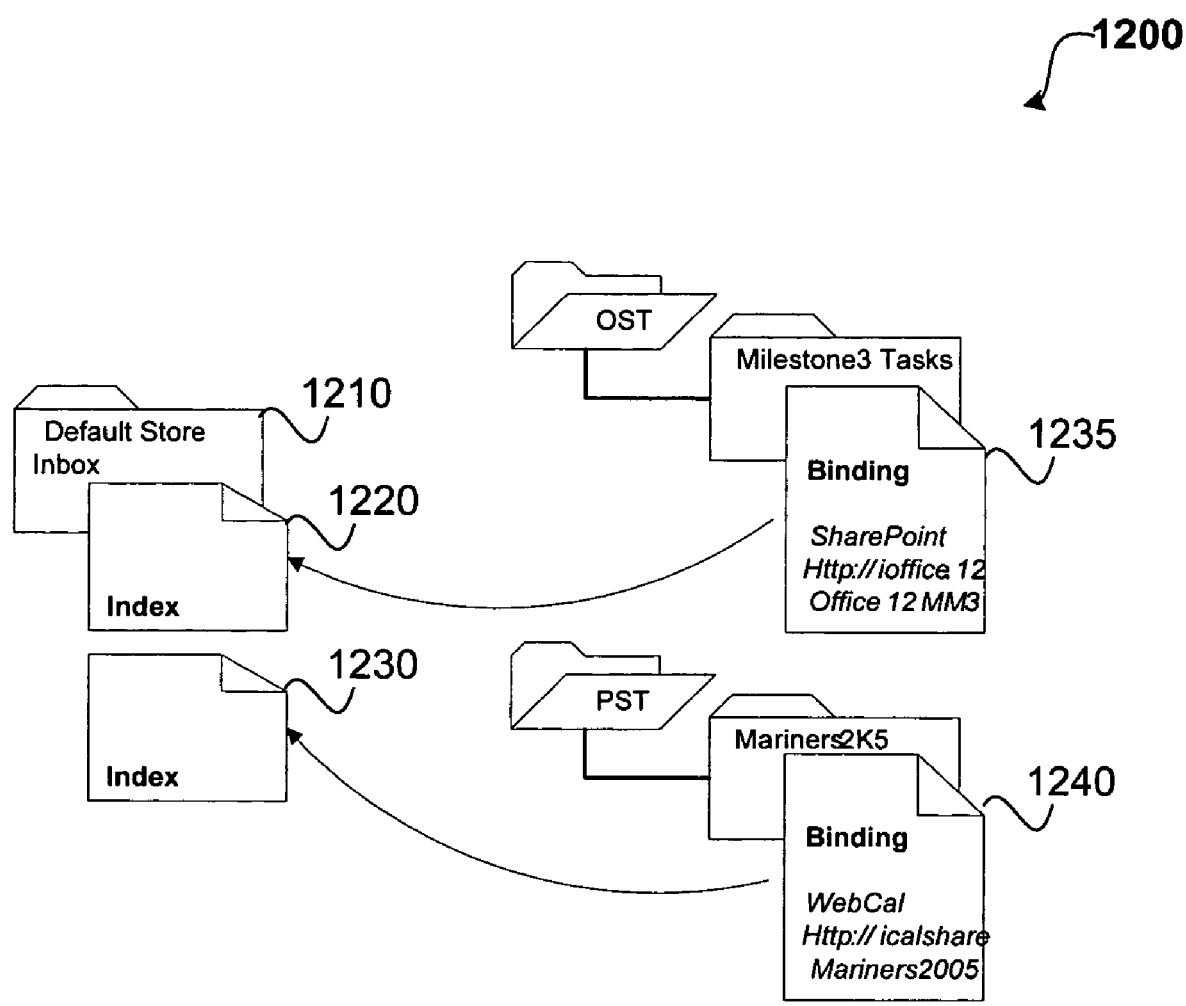
FIG. 12 illustrates a secondary binding.

FIG. 12 illustrates a secondary binding, in accordance with aspects of the invention. When a binding occurs (1235, 1240), a secondary binding or "index" (1220 and 1230) is also saved into a hidden message. Instead of creating this in the associated table of the folder where the data is bound, the index is created in a central location in the default store 1210. This allows enumeration of the bindings from one folder table without crawling the store. As illustrated, default store 1210 includes index 1220 and index 1230. In one embodiment, these indices are stored in the inbox of the default store. Whenever sharing providers look for duplicates, attempt to sync, or enumerate their bindings, the indices are actually the ones being enumerated. The index contains enough information to return to the actual Binding, or to regenerate it in case the data is lost or was never present.

Since the binding is essentially being stored in two places, the bindings and indices should be updated in conjunction. Whenever a binding is updated, a corresponding change in the index also occurs. Likewise, the act of unbinding removes the corresponding index, or marks it as deleted.

Figure 13:
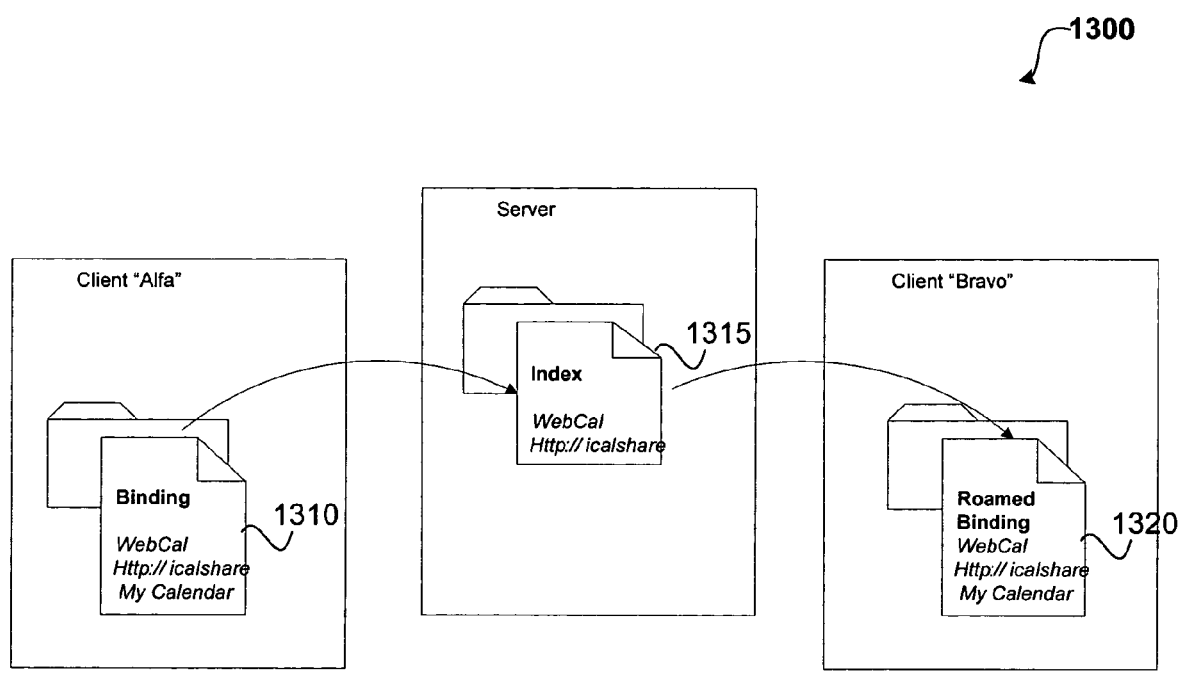
FIG. 13 shows roaming bindings and rationalizing indices.

FIG. 13 shows roaming bindings and rationalizing indices, in accordance with aspects of the invention.

Since indices exist in a central location in the default store, these indices can be seen from multiple clients accessing the server folders. This allows "roaming" of the bindings between clients. During a post-boot process referred to as "rationalization" any index that exists without a corresponding binding is corrected. During this rationalization phase, all indices are compared against all bindings since bindings should not exist without an index. If an index has no corresponding bindings, a new binding is "roamed in". This performs an abbreviated sharing protocol which omits any user interaction, binds the context and starts an initial synchronization of the data. In this particular example, binding 1310 has roamed from client "Alfa" to client "Bravo" to produce roamed binding 1320.

According to one embodiment, the process of roaming and rationalization specifically roams the index (1315), or pointer to the data, and not the data itself. Each client synchronizes the actual data. Also, the index, which was created on a different client, can be marked as not roaming so that (for example) "sensitive" data is never distributed to other clients. For instance, binding 1310 could have been marked as not roaming in which case roamed binding 1320 would never be produced. Server Administrators can control whether users are allowed to roam data through the server.

Subscriptions (bindings) may also be pushed down to the client using the standard deployment tools. These take the form of URLs that are set in the registry and "roamed in" to the resource sharing program during post-boot rationalization. Each URL is activated through the sharing engine, bound, and synchronized with minimal user interaction. The sharing providers are registered with a URL protocol which can configure accounts. According to one embodiment, these bindings are read-only if pushed down to the client through the policy hive.

According to one embodiment, rationalization occurs in the following order. First, administrator-provided configurations are rationalized. Second, account manager configurations are rationalized. Finally, roamed configurations are rationalized.

Sharing Account Management

Sharing providers may closely parallel account types. Each binding could potentially be considered its own account, but since bound sharing relationships are anticipated to be numerous and very common, each Sharing Provider may be represented as an account with small sub-accounts (the bindings).

can be accessed and updated independently from the store. This is conceptually an external index, and allows the account manager from the mail applet to participate in sharing management.

When a binding is saved, the base provider also saves an index, and updates the external index to ensure all references are up to date. According to one embodiment, the external index file consists of a simple XML-based schema which can be easily parsed to determine which providers are active and what relationships have been bound. This file is saved in a default location for MAPI-profile specific files, and is referred to as: "sharing.xml.obi"

The following portion exemplifies the basic schema of this file:

```
<sharing>
    <providers>
        <provider id="wss" guid="{C0046-...}" bindings="yes" ever="1">
        Windows SharePoint Services
        </provider>
    </providers>
    <bindings>
        <binding type="in" prov="wss" instance="{guid}" byPolicy="1" >
            <remoteName>Office 12 M3 Schedule</remoteName>
            <configURL>stssync://v3/wss?...&...</configURL>
        </binding>
        <binding type="in" prov="wss" instance="{guid}" roamedIn="1"\>
            <remoteName>Outlook Dev OOF Schedule</remoteName>
            <configURL>stssync://v3/wss?...&...</configURL>
        </binding>
    </bindings>
</sharing>
        Sharing Sync Groups
interface ISharingProvider:IUnknown
{
        HRESULT LoadContextFromMsg(IDispatch* pmsg, IShrecx** ppshrecx);
        HRESULT SaveContextIntoMsg(IShrecx* pshrecx, IDispatch* pmsg);
        HRESULT LoadContextFromURL(PCWSTR pwzURL, IShrecx** ppshrecx);
        HRESULT SaveContextIntoURL(IShrecx* pshrecx, BSTR* pbstr);
        HRESULT EnumBindings(DWORD dwFlags, IShrecxEnum** ppenumsx);
        HRESULT ValidateCompatibility(IShrecx* pshrecx, PCWSTR pwzRecips,
IMapiProp* pmpScope);
        HRESULT CreateCompatibleContext(IMAPIProp* pmprop, IShrecx**
ppshrecx);
        HRESULT CompareRelationship(IShrecx* pshrecxL, IShrecx* pshrecxR);
        HRESULT DetectDuplicateRelationship(IShrecx* pshrecx, IShrecx**
ppshrecxDup);
        HRESULT ResolveDuplicateRelationship(HWND hwndUI, IShrecx*
pshrecxNew, IShrecx* pshrecxDup, DWORD* pdwResolution);
        HRESULT UserVerifyRelationship(HWND hwnd, IShrecx * pshrecx);
        HRESULT UserAdvancedConfiguration(HWND hwnd, IShrecx * pshrecx);
        HRESULT PrepareLocalStorage(HWND hwndUI, IShrecx* pshrecx);
        HRESULT PrepareRemoteStorage(HWND hwndUI, IShrecx* pshrecx);
        HRESULT BindRelationship(IShrecx* pshrecx);
        HRESULT UnbindRelationship(IShrecx* pshrecx);
        HRESULT PrepareToSync(DWORD dwReason, IShrecx* pshrecx,
ISharingSync** ppvObj);
        HRESULT GetBrandedResource(IShrecx* pshrecx, DWORD
dwEBResourceID, DWORD dwType, HANDLE* phimg, BSTR* pbstr);
        HRESULT GenerateDescription(DWORD dwFlags, IShrecx * pshrecx, BSTR*
pbstr);
        HRESULT GetProviderInfo(SPIN* pspin);
        //...other specific get/set prop methods...
};
```

Account configuration supports administration of bindings (creation, deletion, etc.). The bindings are available even when the user is not logged onto the store. Indices are therefore also indexed outside the store in a configuration file that The LoadContextFrom* methods can be called to create a sharing relationship context for the given provider. A context can be loaded from a URL or message during initial configuration, or from a binding or index message. This override allows the provider to specialize an implementation of the context, though it is typically not necessary. Providers may also wish to set provider-specific defaults for their context.

The SaveContextInto* methods allow bindings to generate a URL or message in order to re-share the data, or to bind to a message or index. Providers might also request a binding to generate a URL for the purposes of placing sharing links on a generated web page.

The EnumBindings method allows the caller to enumerate through bindings that are specific to this particular provider. Bindings can be limited in scope to the folders/subfolders of a given IMAPIProp*, if provided. The enumerator returned can iterate over the bound sharing relationships on a folder which pertain to this particular provider.

The ValidateCompatibility call allows dynamic validation of a folder, message, or recipient. While a sharing message is being processed, providers might validate certain types of recipients. For example, Exchange sharing might be unavailable when recipients cannot be resolved in the Global Address Book. Certain folders cannot be shared with certain providers, etc.

The CreateCompatibleContext method is used to create a context that is compatible for sharing out the object passed—typically a folder. This provider advertised its ability to share this folder in the ValidateCompatibility call, and is capable of generating a valid initialized context.

Duplicate relationships are handled with calls to CompareRelationship, DetectDuplicateRelationship, and ResolveDuplicateRelationship. During Detection, Comparison happens several times, and if a duplicate is detected, the provider is asked to Resolve it.

The UserVerifyRelationship method allows custom processing when a relationship is about to be established. This also provides a mechanism for Trustworthy Computing's "Prominent Notice" to help ensure full disclosure of data sharing commitments to users.

UserAdvancedConfiguration allows custom UI when a provider supports properties beyond the standard sharing relationship context that should be available to the user. These may be made available from the Prominent Notice dialog prior to establishing the relationship, and may be found in management IJI such as the Account Manager.

Once user acceptance of the relationship is established, the Provider has an opportunity to connect with the remote data source and prepare a download location for the local data source. The PrepareRemoteStorage method and PrepareLocalStorage methods provide this opportunity. Credential negotiation, folder creation, or other similar work may be done here.

Relationships are ultimately established or revoked using the BindRelationship and UnbindRelationship methods respectively. Flags are passed to add context to the reason for establishing (binding) or revoking (unbinding) the sharing relationship. Binding essentially entails setting all the properties in the sharing relationship context onto the message. The message can be a Sharing Message (IPM.Sharing.Parcel*) which is sent to another user (see: Sharing Protocol) or a binding on an associated message (IPM.Sharing.Binding.*) for a local folder.

The Sharing Protocol supports revocation using a sharing message which triggers the Unbind call. Unbinding entails either marking the sharing relationship as no longer active, or deleting the sharing relationship completely. An inactive sharing relationship no longer syncs, but still archives the fact that a relationship once existed, acting as a "tombstone." It is recommended that Providers mark relationships as deleted, allowing roaming and Rationalization to cascade the deletion to all clients prior to full deletion.

Once a sharing relationship is bound, the PrepareToSync method provokes the provider to instantiate a sync object that can be used to synchronize the given relationship on a background thread. This call may be made on any thread, but subsequent calls to the object returned will occur on the background thread.

The GetBrandedResource method provides a dynamic mechanism for the provider to surface more sophisticated UI through strings or images. ResourceIDs are defined for all Sharing Providers.

The GenerateDescription method allows generation of a string that details the sharing relationship. This string could be shown to allow validation of a potential relationship, or to describe an already-bound relationship. This string may be used in various parts of the user interface to describe the bound relationship.

GetProviderInfo allows the caller to get information appropriate for rendering UI concerning the provider or any of its associated relationships. The SPIN struct contains very basic metadata about the provider:

```
typedef struct SharingProviderInfo // spin
{
    GUID      guid;       // the GUID for this provider
    DWORD     dwCaps;     // provider capabilities
    PCWSTR    pwzName;    // localized name of provider
    PCWSTR    pwzURL;     // URL for provider information
    HICON     hicon;      // suitable provider icon
} SPIN;
```

The SPIN members are descriptive of the provider in general, not of any sharing relationship in particular. The information in this structure is typically static, and does not need to be allocated or copied.

Individual get_* property access methods are also made available for the members of the SPIN structure to allow simple access without the overhead of the entire structure. The methods are self-explanatory and are as follows:

```
get_Guid(GUID* pguid)
get_Caps(DWORD* pdwCaps);
get_Name(PWSTR pwz, int* pcch);
get_URL(PWSTR pwz, int* pcch);
get_Icon(HICON* phicon);
```

Note that no set_* accessors are available for these properties, they are Read-Only for users of the ISharingProvider interface.

The Sharing Engine object implements ISharingEngine, an interface that negotiates, enumerates, indexes, and manages sharing providers and relationships.

```
interface ISharingEngine: IUnknown
{
        HRESULT EnumProviders(DWORD dwFlags, ISharingProviderEnum**
ppvEnum);
        HRESULT EnumBindings(DWORD dwFlags, REFCLSID guidProv,
IMAPIProp* prop, ISharingRelationshipContextEnum** ppvEnum);
        HRESULT EnumCompatibleProviders(DWORD dwFlags, PCWSTR
pwzRecipients, IMAPIFolder* pmfold, IShrecx* pshrecx, ISharingProviderEnum**
ppvEnum);
        HRESULT LookupProvider(PCWSTR pwzURL, IMsgStore* pmsgStore,
IDispatch* pmsg, IMAPIProp* pmprop, GUID* pguidProvider);
        HRESULT InstantiateProvider(REFCLSID guid, ISharingProvider** ppvOut);
        HRESULT CreateRelationshipContext(HWND hwndUI, PCWSTR pwzURL,
ISharingRelationshipContext** ppShReCx);
        HRESULT AcquireLock(IMAPIFolder* pmfold, IShrecx* pshrecx, DWORD
dwReason, ISmartLock** ppSmartLock);
        HRESULT PrepareToShare(HWND hwndUI, IShrecx* pshrecx);
        HRESULT ShareAndBind(HWND hwndUI, IShrecx* pshrecx);
        HRESULT SyncRelationship(DWORD dwReason, IShrecx* pshrecx
IEnumShrecx* penumsx, IWorkInProgress* pwip);
        HRESULT PerformSharingProtocol(HWND hwndUI, IShrecx* pshrecx);
};
```

The Enum* methods provide UI or other high-level code a way to easily iterate through the existing providers, or existing bindings. Bindings can be limited in scope to the folders/subfolders of a given IMAPIProp, if provided. Providers can be filtered based on their compatibility with various parameters.

The LookupProvider method is a handy shortcut for enumerating through all providers and looking for the one that supports the given protocol, or is bound to the given folder or message.

The InstantiateProvider method is a direct way to gain access to a specific sharing provider instance.

The CreateRelationshipContext method provides a mechanism for sharing in data from various sources. The Sharing Engine determines which provider is the right one for the job, then prepare a context that can be used to perform the remainder of the sharing protocol.

The PrepareToShare method performs sequentially the first portion of the sharing protocol, namely: duplicate detection, duplicate resolution, and user verification.

The ShareAndBind method performs the second portion of the sharing protocol, namely: remote storage preparation, local storage preparation, contextual binding, and syncing.

The SyncRelationship method triggers a sync of data which is bound by the given context. Progress reporting is accomplished through the IWorkInProgress* passed in.

The AcquireLock method locks folders for deletion, syncing, or other lockable purposes.

Figure 14:
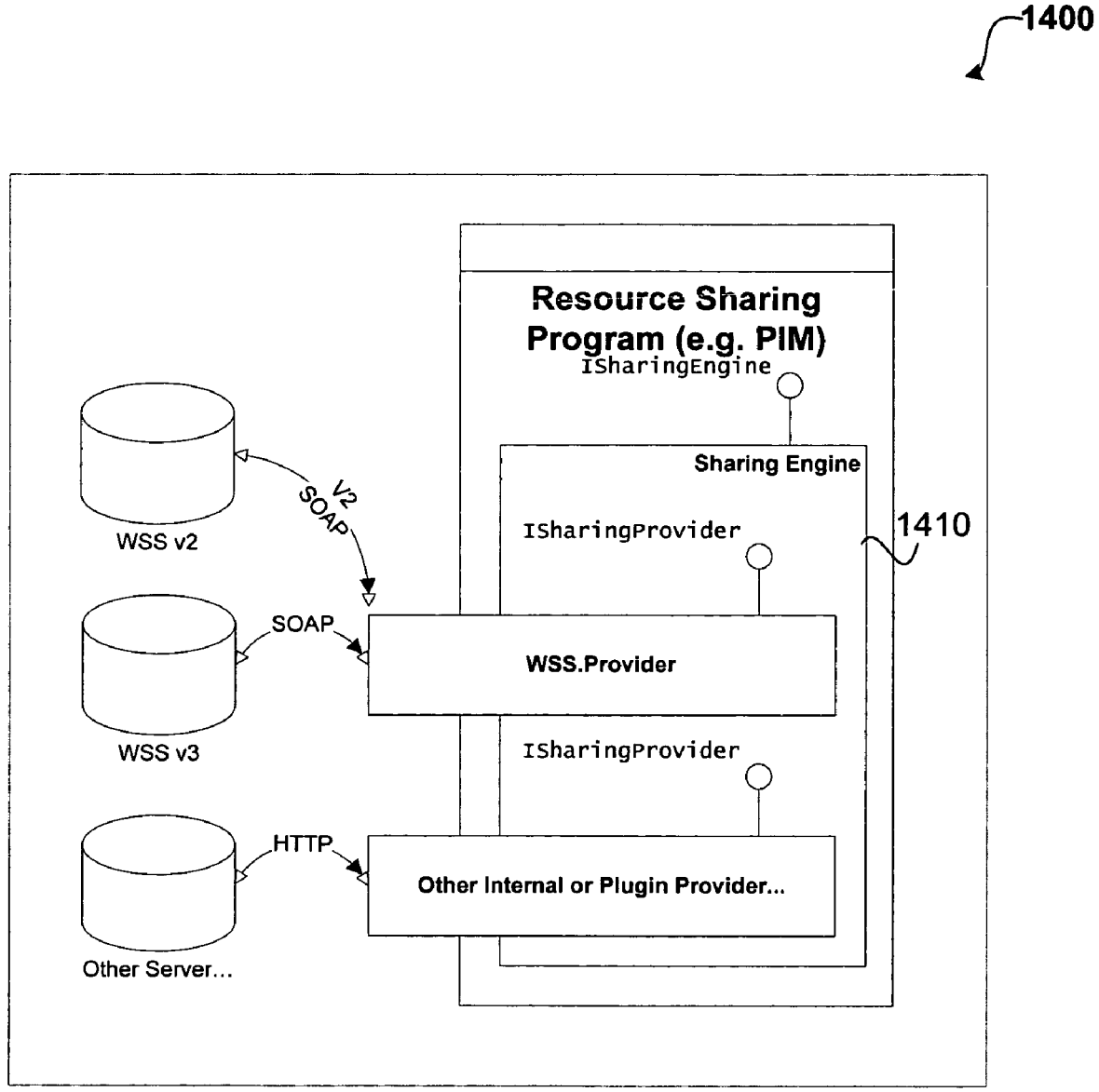
FIG. 14 illustrates a sharing provider overview, in accordance with aspects of the invention.

FIG. 14 illustrates a sharing provider overview, in accordance with aspects of the invention. Sharing Providers plug into the Sharing framework in order to integrate with a sharing resource program and its data stores. According to one embodiment, three interfaces are implemented by Sharing Providers. The ISharingProvider 1410 interface is used for sharing relationship establishment and configuration. This interface encapsulates most of the functionality that is specific to relationships with the particular provider including verification, establishment, revocation, recipient validation, etc.

Sharing providers may support URL protocols for the establishment of sharing relationships. These URLs can be placed in web pages or HTML messages for delivery or discovery by participators. These HTML pages constitute sharing spaces. Current examples of such sharing URL protocols, are the webcal: and stssync: protocols.

The sharing resource program, such as an email client, is registered as a handler for protocols supported by sharing providers. These registrations are added to PIM setup. When participators click on the URL, the shell launches the PIM program with the following exemplary command line: %path%\PIM.exe /share %URL%, where %URL% is the actual URL in the share space which the user clicked, and %path% is the path to the PIM executable registered on the system.

The PIM looks up a sharing provider that supports the given URL scheme and instantiates that provider. The provider knows how to extract Sharing relationship context from the URL and/or its target, and how to establish a Sharing relationship with this context.

The following example shows exemplary Sharepoint® Sharing Provider registry entries for URL configuration:

```
[HKEY_CLASSES_ROOT\stssync]
@="URL:Windows Sharepoint Services (WSS) Sharing Protocol"
"URL Protocol"=""
[HKEY_CLASSES_ROOT\stssync\DefaultIcon]
@="%OFFICE12%\\OUTLOOK.EXE,-9403"
[HKEY_CLASSES_ROOT\stssync\shell]
@="open"
[HKEY_CLASSES_ROOT\stssync\shell\open]
@=""
[HKEY_CLASSES_ROOT\stssync\shell\open\command]
@="\"%OFFICE12%\\OUTLOOK.EXE\" /share \"%1\""
```

Other provider sharing URL schemes are registered similarly, using the SAME open command syntax with the SAME PIM command-line switch (/share). PIM will differentiate between the protocols by examining the URL passed into the command line expanded from %1 above.

Sharing Providers may also register as a handler for certain file types (such as .ics, .vcs, or .rdf). Registration as a handler follows a similar pattern as above. The following are two exemplary methods:

Method #1:

Use a separate command-line for the PIM program (such as "/ical") for Shell associations

```
[HKEY_CLASSES_ROOT\.ics]
"Content Type"="text/calendar"
@="icsfile"
[HKEY_CLASSES_ROOT\icsfile]
@="iCalendar File"
[HKEY_CLASSES_ROOT\icsfile\DefaultIcon]
@="%OFFICE12%\\1033\\OUTLLIBR.DLL,0"
[HKEY_CLASSES_ROOT\icsfile\shell]
[HKEY_CLASSES_ROOT\icsfile\shell\open]
[HKEY_CLASSES_ROOT\icsfile\shell\open\command]
@="\"%PIM.EXE\" /ical \"%1\""
```

This method uses a separate handler inside of the PIM program for the specific command-line parameter, and separate code to redirect to the sharing provider for handling the file type.

Method #2:

Overlay a protocol (such as "wedcal:") to redirect to the sharing engine

```
[HKEY_CLASSES_ROOT\.ics]
"Content Type"="text/calendar"
@="icsfile"
[HKEY_CLASSES_ROOT\icsfile]
@="iCalendar File"
[HKEY_CLASSES_ROOT\icsfile\DefaultIcon]
@="%OFFICE12%\\1033\\OUTLLIBR.DLL,0"
[HKEY_CLASSES_ROOT\icsfile\shell]
[HKEY_CLASSES_ROOT\icsfile\shell\open]
[HKEY_CLASSES_ROOT\icsfile\shell\open\command]
@="\"%OFFICE12%\\OUTLOOK.EXE\" /share webcal:\"%1\""
```

Method 2 does not use a special handler, since it uses the /share mechanism, which forwards appropriate protocols to the correct Sharing Provider. The provider may want to be aware of different semantics, however, between launched files from the shell and specific protocols launched from the web. A dummy protocol can be used to differentiate between these two usages. The provider would then register for both protocols and the Sharing Engine would simply forward handling to the provider.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for establishing sharing of a resource, comprising:
   determining a resource to share via a sharing resource application residing on a computing device, wherein the resource to share is a resource of the initiator that is shared with of the participant;
   establishing a sharing relationship between the initiator and a participant to share the resource; wherein the sharing relationship is established through the use of a sharing message that includes properties; in which some of the properties are supplied by the initiator and some of the properties are supplied by the participant after receiving the sharing message and wherein the sharing message properties identify at least:
   the initiator;
   the participant;
   a local data source and a remote data source;
   wherein the sharing message indicates the selected resource; wherein the sharing message is associated with a message class comprising:
   a parcel message class that indicates data to flow from only the initiator to the participant by not requiring reciprocal sharing of a resource of the participant;
   a self-addressed-stamped-envelope (SASE) class that indicates data to flow only from the participant to the initiator by including a reciprocal request for a resource of the participant;
   a parcel class with SASE that indicates data to flow both from the participant to the initiator and from the initiator to the participant including both the resource of the initiator and a reciprocal request for a resource of the participant; and
   creating a sharing relationship context that includes at least some of the properties that are associated with the sharing message and wherein the sharing relationship context serializes configuration information into and out of at least one of:
   a folder;
   a message; and
   a URL.

2. The method of claim 1, wherein the sharing message properties include at least one Uniform Resource Locator (URL) that identifies at least one of:
   a path to a provider of the resource and
   a path to the resource.

3. The method of claim 1, wherein the initiator is identified within the sharing message by an SMTP address.

4. The method of claim 1, wherein the sharing message may be configured to indicate:
   data flow from the initiator to the participant;
   data flow from the participant to the initiator;
   data flow in both directions between the initiator and the participant;
   a response from the participant;
   a revocation of the sharing relationship; and
   an update to the sharing relationship.

5. The method of claim 1, wherein establishing the sharing relationship comprises setting at least one of:
   a start date that indicates when the sharing relationship is to start and
   a stop date that indicates when the sharing relationship is to stop.

6. The method of claim 1, wherein the properties supplied by the initiator include:
   a unique identifier for the sharing relationship;
   a unique identifier for a provider; and
   a URL related to a location of the data to be shared.

7. The method of claim 1, wherein the properties supplied by the participant include:
   a path to locally replicated data,
   a unique identifier of the locally replicated data and
   sync settings.

8. The method of claim 1, further comprising binding the sharing relationship context and creating an index that is stored within a location such that an enumeration of the bindings may be performed from a single store.

9. The method of claim 8, further comprising performing rationalization that determines when to roam a binding that comprises determining when an index has no corresponding bindings, and when determined; creating a binding for the index such that the resource may now be shared from more than one location.

10. The method of claim 9, wherein the index may be marked at not roaming such that the resource is not distributed to other clients.

11. A computer-readable storage medium having computer-executable instructions for sharing resources, the instructions comprising:
- determining a resource to share via a sharing resource application residing on a computing device, wherein the resource to share is a resource of the initiator that is shared with of the participant;
- creating a sharing message that is used to establish a sharing relationship for the resource; wherein the sharing message includes properties that:
  - identify a provider through a URL;
  - identify an initiator through an SMTP address;
  - identify a content type of remote data;
  - identify a path to locally replicated data;
  - identify sync settings; in which some of these properties are supplied by the initiator and in which some of these properties which are supplied by the participant after receiving the sharing message and wherein the sharing message identifies a local data source and a remote data source; wherein the sharing message is associated with a message class comprising:
  - a parcel message class that indicates data to flow from only the initiator to the participant by not requiring reciprocal sharing of a resource of the participant;
  - a self-addressed-stamped-envelope (SASE) class that indicates data to flow only from the participant to the initiator by including a reciprocal request for a resource of the participant;
  - a parcel class with the SASE that indicates data to flow both from the participant to the initiator and from the initiator to the participant including both the resource of the initiator and a reciprocal request for a resource of the participant; and
- creating a sharing relationship context that includes at least some of the properties that are associated with the sharing message and wherein the sharing relationship context serializes configuration information into and out of at least one of:
  - a folder;
  - a message; and
  - a URL; and
- binding the sharing relationship context.

12. The computer-readable storage medium of claim 11, wherein the properties farther include at least one of:
- a start date;
- a stop date; a filter; and
- extensions.

13. The computer-readable storage medium of claim 11, wherein the sharing relationship context may be loaded from at least one of:
- a URL;
- a sharing message;
- an index; and
- a binding.

14. The computer-readable storage medium of claim 10, further comprising creating an index relating to the binding and roaming the binding to a new location when determined that the initiator has moved locations.

15. A system for establishing sharing of a resource, comprising:
- a processor and a computer-readable storage medium;
- a sharing engine executing on the processor that is coupled to a network and that is configured to:
  - enumerate sharing providers;
  - add a sharing provider through an object model;
  - provide information about a sharing relationship to one of the sharing
  - providers through a sharing relationship context; and
- a client that is coupled to the network and to the sharing engine and that is configured to:
- establish a sharing relationship with one of the sharing providers by creating a sharing message that identifies the client and the sharing provider, wherein the sharing message includes:
  - an SMTP address for the client; and
  - a URL identifying at least one of:
    - a path to the sharing provider; and
    - a path to the resource; wherein the shared resource is selected from:
      - a resource of the client; and a resource of the provider and
      - an associated resource of the client: and wherein the sharing message is associated with a message class comprising:
    - a parcel message class that indicates data to flow from only the client to the sharing provider by not requiring reciprocal sharing of a resource of the sharing provider;
    - a self-addressed-stamped-envelope (SASE) class that indicates data to flow only from the sharing provider to the client by including a reciprocal request for a resource of the sharing provider;
    - a parcel class with the SASE that indicates data to flow both from the sharing provider to the client and from the client to the sharing provider including both the resource of the client and a reciprocal request for a resource of the sharing provider.

16. The system of claim 15, wherein the client may establish set a start date and an end date for the sharing relationship.

17. The system of claim 15, wherein the client and the sharing provider each have a unique identifier that is used within the sharing message.

18. The system of claim 17, wherein the sharing message is an email message.

* * * * *

UNITED STATES PATENT AND TRADEMARK OFFICE
CERTIFICATE OF CORRECTION

PATENT NO.        : 7,702,802 B2
APPLICATION NO.   : 11/250662
DATED             : April 20, 2010
INVENTOR(S)       : Cameron D. Stillion et al.

It is certified that error appears in the above-identified patent and that said Letters Patent is hereby corrected as shown below:

In column 25, line 49, in Claim 12, delete "farther" and insert -- further --, therefor.

In column 26, line 32, in Claim 15, delete "client:" and insert -- client; --, therefor.

Signed and Sealed this
Twenty-second Day of February, 2011

David J. Kappos
*Director of the United States Patent and Trademark Office*